(12) United States Patent
Gurgul et al.

(10) Patent No.: US 11,601,888 B2
(45) Date of Patent: Mar. 7, 2023

(54) DETERMINING LOCATION USING MULTI-SOURCE GEOLOCATION DATA

(71) Applicant: Snap Inc., Santa Monica, CA (US)

(72) Inventors: Piotr Gurgul, Hergiswil (CH); Lucas Rangit Magasweran, Berlin (DE)

(73) Assignee: Snap Inc., Santa Monica, CA (US)

( * ) Notice: Subject to any disclaimer, the term of this patent is extended or adjusted under 35 U.S.C. 154(b) by 33 days.

(21) Appl. No.: 17/444,111

(22) Filed: Jul. 30, 2021

(65) Prior Publication Data

US 2022/0308156 A1 Sep. 29, 2022

Related U.S. Application Data

(60) Provisional application No. 63/200,789, filed on Mar. 29, 2021.

(51) Int. Cl.
*H04W 52/26* (2009.01)
*H04W 52/02* (2009.01)
(Continued)

(52) U.S. Cl.
CPC ....... *H04W 52/0261* (2013.01); *G01S 5/0063* (2013.01); *G01S 5/0252* (2013.01);
(Continued)

(58) Field of Classification Search
CPC ............ H04W 52/0261; H04W 64/003; G01S 5/0063; G01S 5/0252; G01S 5/02685;
(Continued)

(56) References Cited

U.S. PATENT DOCUMENTS

| 666,223 A | 1/1901 | Shedlock |
| 4,581,634 A | 4/1986 | Williams |
| (Continued) | | |

FOREIGN PATENT DOCUMENTS

| CA | 2887596 A1 | 7/2015 |
| EP | 2051480 A1 | 4/2009 |
| (Continued) | | |

OTHER PUBLICATIONS

U.S. Appl. No. 17/363,665, filed Jun. 30, 2021, Scheduling Requests for Location Data.
(Continued)

*Primary Examiner* — Shaima Q Aminzay
(74) *Attorney, Agent, or Firm* — Schwegman Lundberg & Woessner, P.A.

(57) ABSTRACT

Systems, methods, and computer readable media that determine a location of a device using multi-source geolocation data, where the methods include accessing new location data from a location source of a plurality of location sources, where the new location data includes a new position and an accuracy of the new position, and determining a current position and an accuracy of the current position based on the new position, the accuracy of the new position, an previous current position, and an accuracy of the previous current position. The method further includes determining a change in location based on a difference between the current position and the previous current position. Some systems, methods, and computer readable media are directed to scheduling location requests to generate location data where the scheduling and the actual requests are made based on a number of conditions.

20 Claims, 16 Drawing Sheets

(51) Int. Cl.
- *G06T 13/00* (2011.01)
- *G06T 11/00* (2006.01)
- *G01S 5/02* (2010.01)
- *G01S 5/00* (2006.01)
- *H04W 64/00* (2009.01)
- *G01S 19/48* (2010.01)

(52) U.S. Cl.
CPC .......... *G01S 5/02685* (2020.05); *G06T 11/00* (2013.01); *G06T 13/00* (2013.01); *H04W 64/003* (2013.01); *G01S 19/48* (2013.01)

(58) Field of Classification Search
CPC ......... G01S 19/48; G06T 11/00; G06T 13/00; Y02D 10/00; Y02D 30/70
USPC ...................................................... 455/556.1
See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,724,403 | B1 | 4/2004 | Santoro et al. |
| 6,726,860 | B2 | 4/2004 | Narayanaswami |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |

(56) References Cited

U.S. PATENT DOCUMENTS

| | | |
|---|---|---|
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,348 B2 | 3/2014 | Tysowski |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,674,311 B1 | 6/2020 | Bouba et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |

(56) References Cited

U.S. PATENT DOCUMENTS

| | | |
|---|---|---|
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192709 A1 | 7/2009 | Yonker et al. |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0300875 A1 | 12/2011 | Kim et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |

(56) References Cited

U.S. PATENT DOCUMENTS

| | | |
|---|---|---|
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0127015 A1* | 5/2012 | Weedon ............... G01S 13/781 342/126 |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290253 A1 | 11/2012 | Barrett et al. |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0032682 A1 | 1/2014 | Prado et al. |
| 2014/0192641 A1 | 1/2014 | Wachman et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057656 A1 | 2/2014 | Hasegawa |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2615/0222814 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |

(56) References Cited

U.S. PATENT DOCUMENTS

| | | |
|---|---|---|
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0277883 A1 | 9/2016 | Jeon |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |
| 2020/0314586 A1 | 10/2020 | Bouba et al. |
| 2020/0382912 A1 | 12/2020 | Dancie et al. |
| 2020/0401225 A1 | 12/2020 | Jaureguiberry et al. |
| 2021/0011612 A1 | 1/2021 | Dancie et al. |
| 2021/0152979 A1 | 5/2021 | Berardino et al. |
| 2021/0266704 A1 | 8/2021 | Dancie et al. |
| 2021/0377693 A1 | 12/2021 | Bouba et al. |
| 2021/0409904 A1 | 12/2021 | Baylin et al. |
| 2022/0174455 A1 | 6/2022 | Guillaume |
| 2022/0269345 A1 | 8/2022 | Jaureguiberry et al. |
| 2022/0312332 A1 | 9/2022 | Gurgul et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| KR | 101663615 | 10/2016 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | 2022213028 | 10/2022 |
| WO | 2022213029 | 10/2022 |

OTHER PUBLICATIONS

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell the Whole Story", [Online] Retrieved from the Internet: <URL: youtu.be/uF__gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921 /https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w'>, (Nov. 8, 2011), 87 pgs.; 00:47 min.

"Starbucks Cup Magic for Valentine's Day", [Online] Retrieved from the Internet: <URL: https://www.youtube.com/watch?8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

"U.S. Appl. No. 17/363,665, Non Final Office Action dated Jul. 7, 2022", 11 pgs.

"U.S. Appl. No. 17/363,665, Non Final Office Action dated Jul. 21, 2022", 10 pgs.

"International Application Serial No. PCT/US2022/071304, International Search Report dated Aug. 3, 2022", 4 pgs.

"International Application Serial No. PCT/US2022/071304, Written Opinion dated Aug. 3, 2022", 9 pgs.

(56) References Cited

OTHER PUBLICATIONS

"International Application Serial No. PCT/US2022/071305, International Search Report dated Aug. 2, 2022", 4 pgs.
"International Application Serial No. PCT/US2022/071305, Written Opinion dated Aug. 3, 2022", 8 pgs.
"U.S. Appl. No. 17/363,665, Response filed Oct. 21, 2022 to Non Final Office Action dated Jul. 21, 2022", 10 pgs.

* cited by examiner

US 11,601,888 B2

DETERMINING LOCATION USING MULTI-SOURCE GEOLOCATION DATA

CLAIM OF PRIORITY

This application claims the benefit of priority to U.S. Provisional Application Ser. No. 63/200,789, filed Mar. 29, 2021, which is incorporated herein by reference in its entirety.

TECHNICAL FIELD

Examples of the present disclosure relate generally to determining geographic locations for a mobile device using multi-source geolocation data. More particularly, but not by way of limitation, examples of the present disclosure relate to fusing multiple-source geographic locations together to determine a geographic location.

BACKGROUND

Geographic location is often used by many application programs to enhance a user's experience with a mobile device. However, determining a geographic location of the mobile device consumes power and mobile devices are often limited by batteries. Additionally, application programs may request frequent updates to the geographic location of the mobile device.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
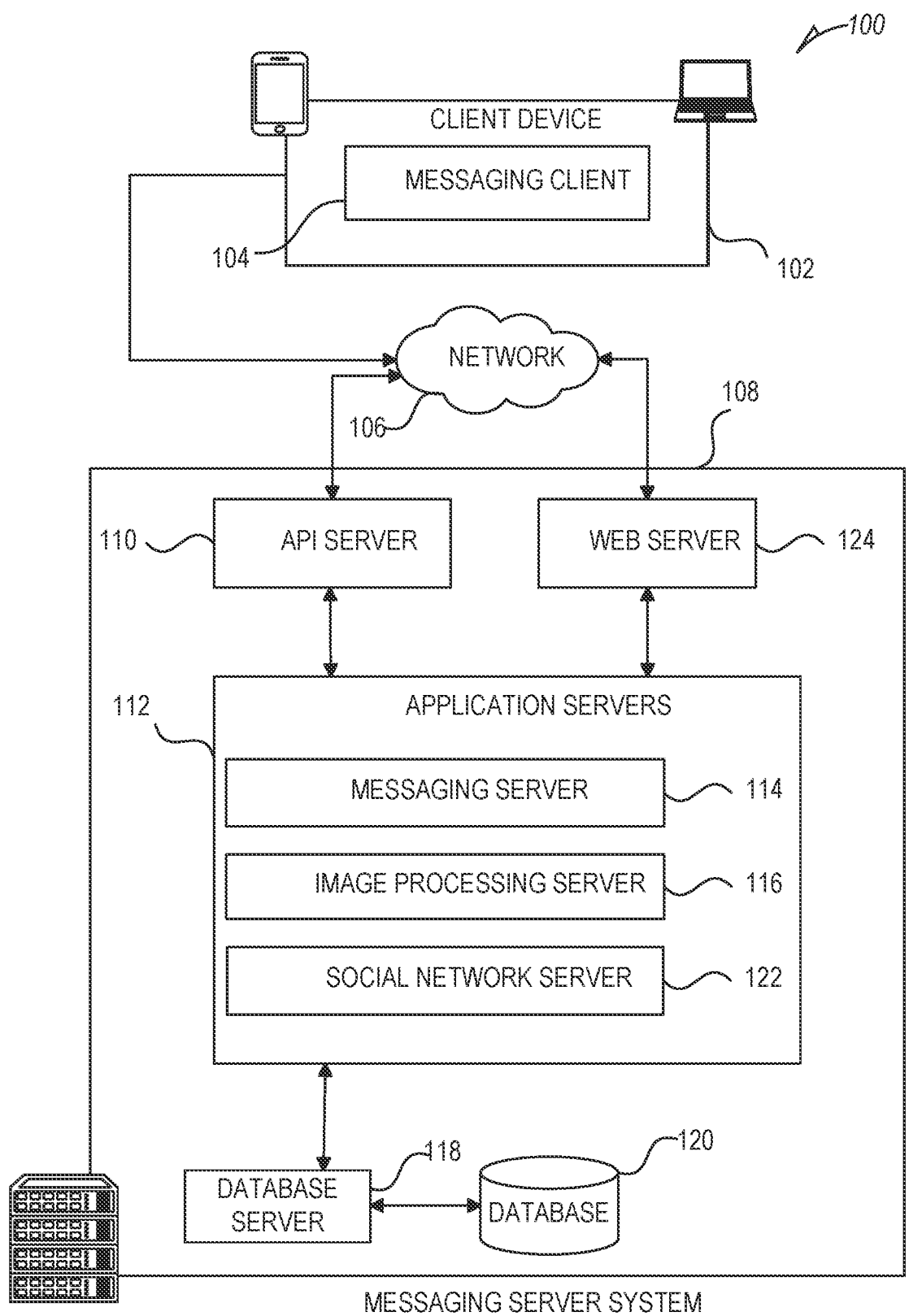
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Users of mobile devices enjoy the services provided by applications that can ascertain the current location of the mobile device. For example, a geographic location aware application on an augmented reality (AR) headset can provide information regarding monuments that the user of the AR headset is near such as the Eiffel Tower or Empire State Building. Many other applications on a mobile device may be enhanced if the current location of the mobile device is known. Examples disclosed herein are directed to providing a current location to applications of a mobile device while lessening the amount of power that is used and fusing location data to provide a current location. Some examples disclosed herein are directed to providing location data to applications while doing one or more of the following: lessening a latency of providing the location data, increasing an accuracy of the location data, and lessening the amount of power that is used to determine the location data.

A technical problem is how to provide current location information to an application on a mobile device while decreasing the amount of power used to provide the current location. In some examples, the technical problem is addressed by fusing together two or more locations to determine a current location of the mobile device. Each of the locations includes data that indicates an accuracy of the location. Often location data that is less accurate requires less power for the mobile device to acquire or determine. In some examples, a current location with an associated accuracy is fused together with a new location with an associated accuracy to determine an updated current location with an updated accuracy. The current location and the new location are fused together based on the geographic location data, associated optional data, and associated accuracies. Fusing together the location data provides a more accurate estimation of the location of the mobile device, in accordance with some examples.

In some examples, the technical problem is addressed by scheduling requests for updated location data from location sources. The scheduling waits to send requests to location sources based on whether conditions are met. For example, a request for a location from a satellite receiver is not made until a display of the mobile device is powered down and/or the mobile device is outdoors. In this way there is not a spike in the power demand that may drain the batteries more than is needed to retrieve a location from a satellite. Additionally, the scheduling bases decisions on a needed accuracy of the location indicated by the application.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
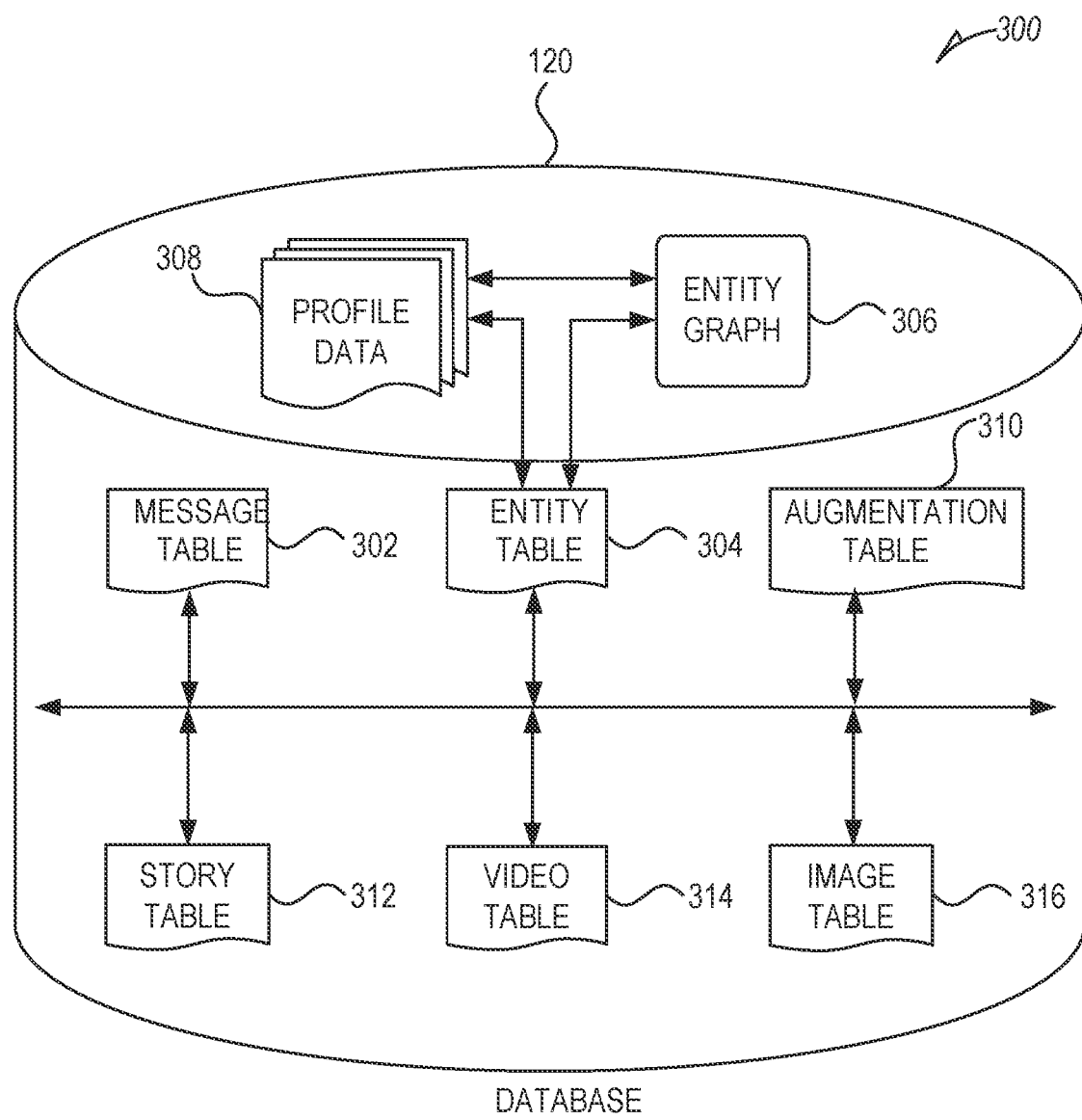
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
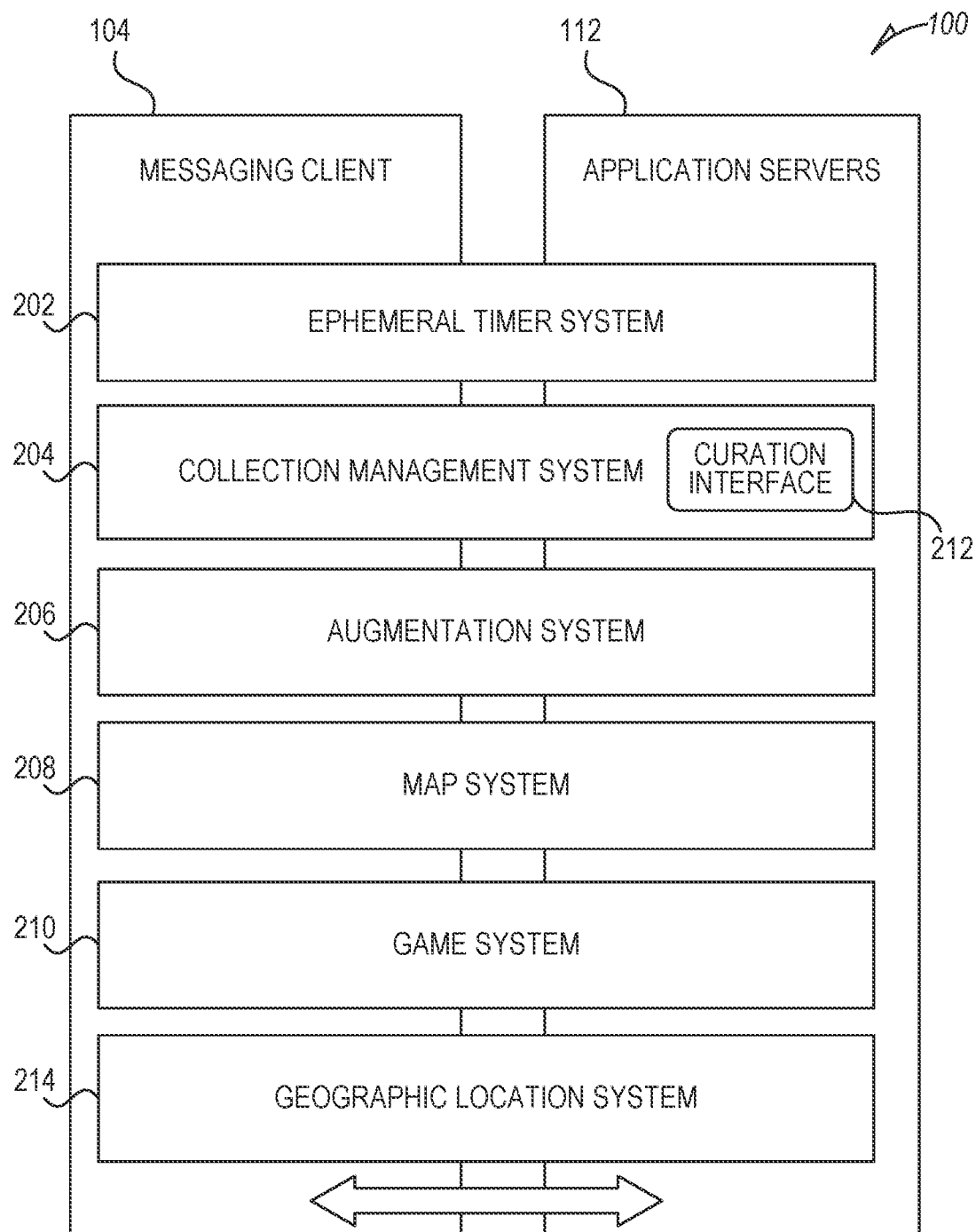
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a geographic location system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 6:
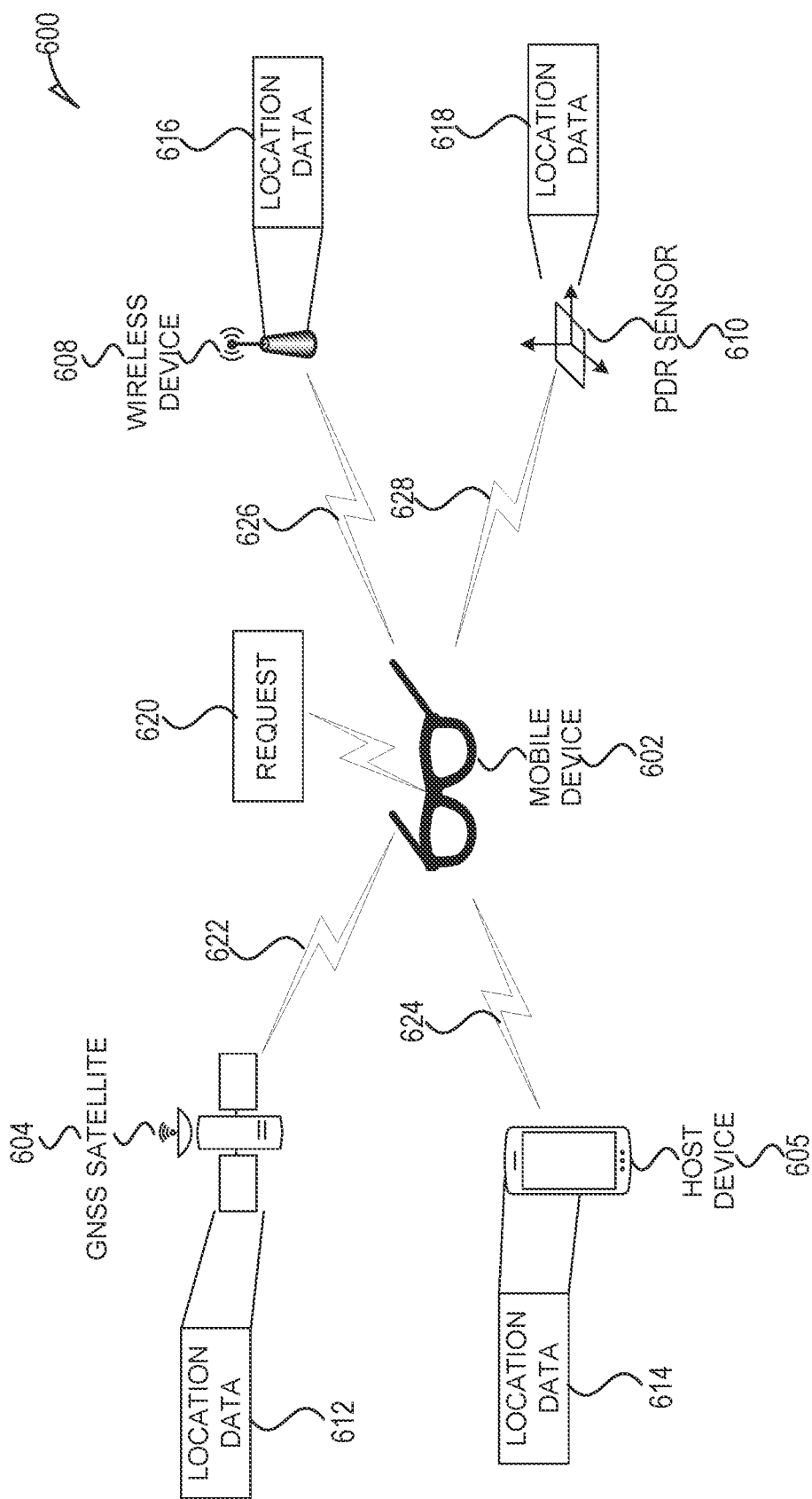
FIG. 6 illustrates sources of location data for a mobile device, in accordance with some examples.

The geographic location system 214 provides various functions to determine a current location 708 (see FIG. 7) of the mobile device 602 (see FIG. 6.) In some examples, the geographic location system 214 interfaces with external devices to determine a current location 708 of the mobile device 602. In some examples, the geographic location system 214 responds to requests for geographic location information from a mobile device 602. In some examples, the geographic location system 214 provides information to assist a mobile device 602 in determining a geographic location such as almanac data for a GNSS system or information regarding other wireless devices with which the mobile device 602 may interact with to determine a geographic location of the mobile device 602.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interest-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in the memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314. The database 120 can also store information for assisting mobile device 602 in determining its location. For example, database 120 may store information regarding access points (APs) that may be used by mobile device 602 for determining its geographic location. The database 120 can also store additional information such as data that may be used to interpret signals from a satellite to determine location.

Data Communications Architecture

Figure 4:
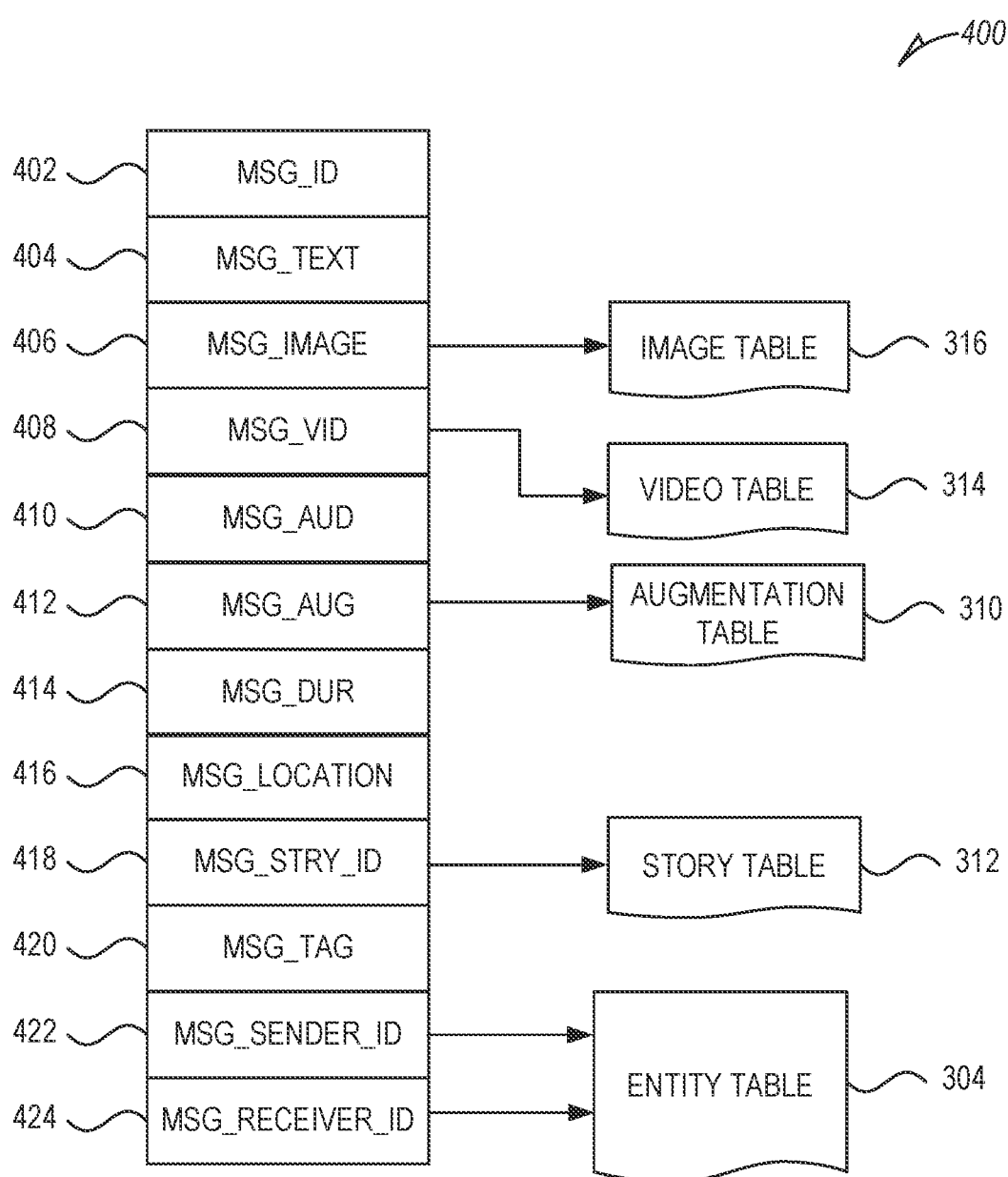
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application server 112. A message 400 is shown to include the following example components:

Message identifier 402 (MSG_ID 402): a unique identifier that identifies the message 400. Message text payload 404 (MSG_TEXT 404): text, to be generated by a user via a user interface of the client device 102, and that is included in the message 400.

Message image payload 406 (MSG_IMAGE 406): image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414 (MSG_DUR 414): parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
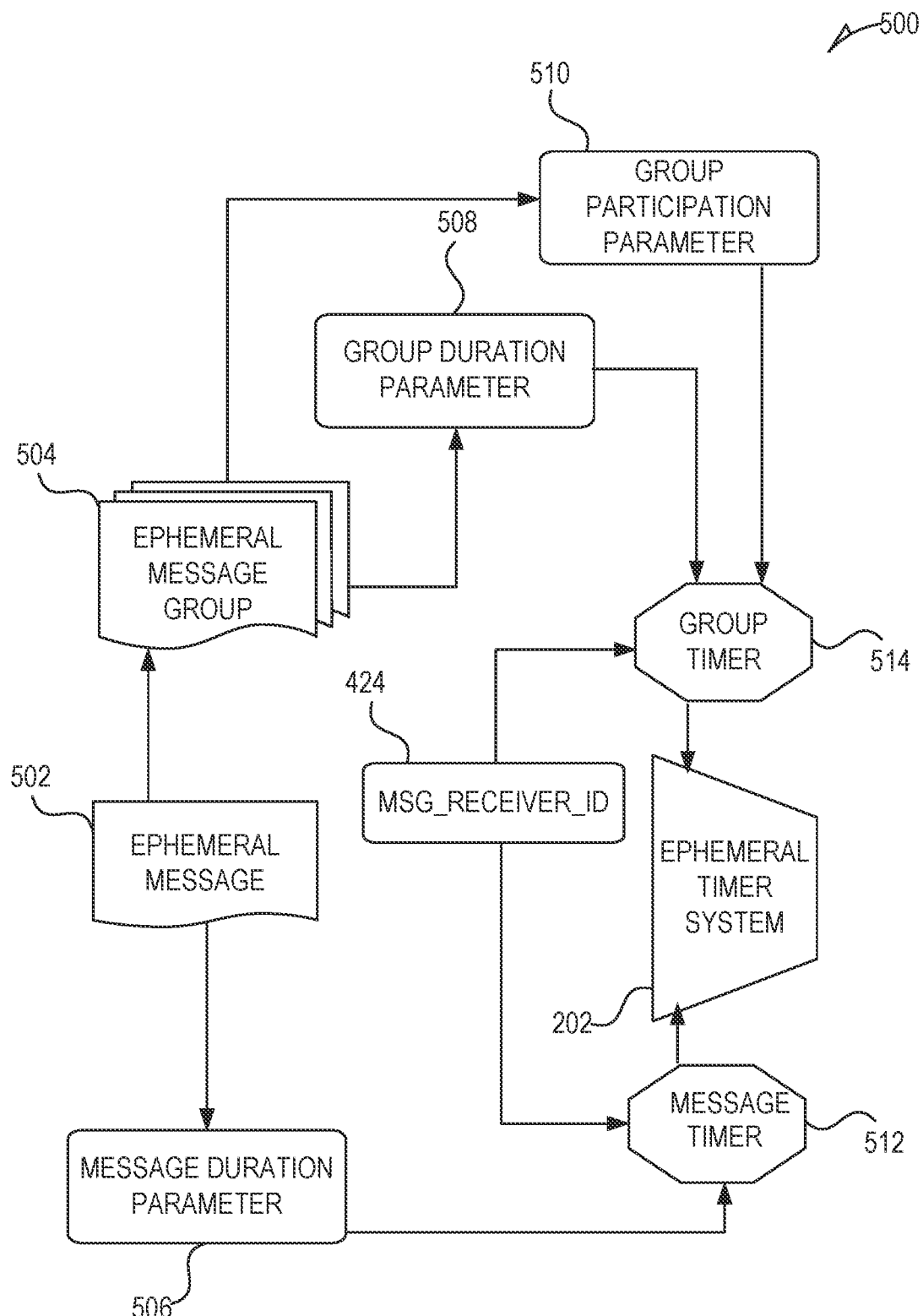
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Determining Location Using Multi-Source Geolocation Data

FIG. 6 illustrates sources of location data 600 for a mobile device 602, in accordance with some examples. The mobile device 602 is a client device 102 of FIG. 1, in accordance with some examples. The mobile device 602 is a wearable electronic device in the form of glasses 1100 of FIG. 11, which may be augmented reality (AR) glasses, in accordance with some examples. The mobile device 602 communicates with positioning systems, which include Global Navigation Satellite System (GNSS) satellite 604, host device 605, wireless device 608, and pedestrian dead reckoning (PDR) sensor 610. The positioning systems provide location data 612, 614, 616, 618 or enable the mobile device 602 to determine location data 612, 614, 616, 618. For example, the location data 614 from the host device 605 may be assisted GNSS (AGNSS) data, an internet protocol (IP) location, a location of the host device 605, a location of the host device 605 with an estimate of a distance the mobile device 602 is from the host device 605, and so forth. Location data 612, 614, 616, 618 is discussed further below in conjunction with Table 2.

The GNSS satellite 604 is one or more satellites that the mobile device 602 communicates with to determine location data 612. The mobile device 602 uses differences in reception times from different GNSS satellites 604 and known positions of the GNSS satellites 604 to determine the location data 612. The AGNSS data is the known positions of the GNSS satellites 604, in some examples. Additionally, the host device 605 is configured to determine location data 612 of the host device 605 from GNSS satellites 604, in accordance with some examples.

The host device 605 is a paired smartphone device or companion device that provides services to the mobile device 602, in accordance with some examples. In some examples the host device 605 scans and collects data of nearby wireless devices such as access points (APs) of Institute of Electrical and Electronic Engineers (IEEE) wireless networks or base stations (BSs) of 3rd Generation Partnership Project (3GPP) wireless networks or a later generation and determines a location of the APs or BSs and provides one or more of the locations of the APs or BSs to the mobile device 602 as location data 614. The host device 605 determines the locations of the APs or BSs by performing a lookup of the location of the APs or BSs in a database 120, requesting their locations from a server device, or determining their locations based on a known location of the host device 605.

The wireless device 608 may be a wireless device that is configured to operate in accordance with one or more communication standards such as IEEE 802, 3GPP, LTE, LTE-Advanced, 5G communications, Bluetooth®, low-energy Bluetooth®, and so forth. In some examples, the wireless device 608 is a 3GPP BS, 5G BS, an IEEE AP, or an IEEE non-AP station. The wireless device 608 and mobile device 602 are configured to operate in accordance with one or more communication protocols to determine a location of the mobile device 602. For example, the communication protocol may be IEEE 802.11az, WiFi positioning service (WFPS), a proprietary protocol, or another communication protocol for determining location. The wireless device 608 may be multiple devices. For example, the wireless device 608 may be two IEEE 802.11az APs that perform a triangulation method with the mobile device 602 to determine a location of the mobile device 602.

The PDR sensor 610 is part of the mobile device 602 and generates location data 618 based on motion of the mobile device 602. The PDR sensor 610 includes sensors such as a gyroscope and generates location data 618 to estimate the distance and direction that mobile device 602 moves.

The mobile device 602 sends a request 620 to a positioning system such as GNSS satellite 604, host device 605, wireless device 608, or PDR sensor 610 over communications 622, 624, 626, 628, respectively. The positioning system such as GNSS satellite 604, host device 605, wireless device 608, or PDR sensor 610 sends communications 622, 624, 626, 628, respectively, that includes location data 612, 614, 616, 618, respectively, in response to the request 620. In some examples the location data 612, 614, 616, and 618 is sent without a request 620.

The mobile device 602 makes a request 620 for location data 612, 614, 616, 618 either to the positioning system or to a module within the mobile device 602. Table 1 provides characteristics of positioning systems. In Table 1 the characteristics include accuracy, latency, power, indoor/outdoor, and conditions for use. The characteristics are for the indicated location data for the positioning system. The characteristics may be different for different types of location data.

The conditions for use of Table 1 are conditions or prerequisites that are either necessary for the use of the positioning system or needed to make use of the positioning system more efficiently in terms of power usage or other operating characteristics. The conditions for use of Table 1, include antenna with a quality signal or high signal/noise ratio, Bluetooth connectivity, availability of wireless protocols, and a prior position. Other conditions for use not listed in Table 1 include the presence of host device 605 or paired mobile device, an application running on the host device 605 to respond to or service the mobile device 602, and indoor or outdoor status. Additional conditions for use may be used. The following is an example of a condition for use. The mobile device 602 determining location data 612 from GNSS satellite 604 signals requires a lot power from receiving the signals and determining the location data 612. If the GNSS satellite 604 signals are stronger, then less power is required. To reduce the amount of power used the mobile device 602 refrains from using the GNSS satellite 604 unless an antenna used to receive the GNSS satellite 604 signals indicates that there is a high signal-to-noise ratio. In some examples, the mobile device 602 refrains from using the GNSS satellite 604 signals unless the mobile device 602 is outside to increase the changes that GNSS satellite 604 signals will have a high signal-to-noise ratio. The mobile device 602 is a low-power device that relies on batteries, in accordance with some examples.

TABLE 1

Characteristics of Location Sources

| Positioning System | Location Data | Characteristic | | | | |
|---|---|---|---|---|---|---|
| | | Accuracy | Latency | Power | Indoor/Outdoor | Conditions for Use |
| GNSS satellite 604 | GNSS data | Higher | Higher | Higher | Outdoor | Antenna with higher signal/noise ratio |
| host device 605 | AGNSS data | Higher | Medium | Lower | Both | Bluetooth/Wireless connection |
| Host device 605 | Other location data | Variable | Variable | Variable | Both | Wireless connection |
| Wireless device 608 | WFPS data | Higher | Medium | Lower | Indoor | Availability of wireless protocol. |
| PDR sensor 610 | PDR data | Lower | Lower | Lower | Both | Prior Position |

Referring to Table 1, in some examples, the positioning system GNSS satellite 604 has the following characteristics: the location data 612 determined is GNSS data, the accuracy is higher than some others, the latency is higher because it takes a relatively longer time to obtain a fix and determine or receive the location data 612; the power required is higher than some others; the mobile device 602 needs to be outdoors to receive the GNSS satellite 604 signals and reduce the power consumed in determining the location data 612; and, a condition for use is an antenna with a higher signal-to-noise ratio in receiving the GNSS satellite 604 signals. Additional characteristics of the GNSS satellite 604 include there is no requirement for an internet or Bluetooth™ connection; the mobile device 602 needs a GNSS receiver 720 and GNSS receiver module 727; and, acquiring AGNSS data, which is needed to determine the location data 612, is time consuming and may be acquired from the host device 605 or GNSS satellite 604.

Referring to Table 1, in some examples, host device 605 has the following characteristics for AGNSS data: a high accuracy since the data is for use with the GNSS satellite 604; low power usage because the AGNSS data and request 620 are transmitted using a low-energy wireless protocol such as LE Bluetooth™; a medium latency to receive the AGNSS data as the low-energy wireless protocols have a higher latency than other wireless protocols; a low power requirement when LE Bluetooth™ is used; the AGNSS data may be provided by the host device 605 either indoors or outdoors, although the host device 605 may be better able to collect the AGNSS data outdoors; and, there is a requirement for the mobile device 602 and the host device 605 to be in communication via a wireless connection such as Bluetooth™ and there may be a requirement that a software module or application is running on the host device 605 to provide services to the mobile device 602.

Referring to Table 1, in some examples, host device 605 has the following characteristics for other location data 614: a variable accuracy since the host device 605 may provide location data 614 in several different ways with different accuracies such as is described herein; a variable latency since the host device 605 may use a high energy wireless connection or a low energy wireless connection; a variable power usages since the host device 605 may use a high energy wireless connection or a low energy wireless connection; the host device 605 can connect with the mobile device 602 either indoors or outdoors; and, there is a requirement that the host device 605 be connected to the mobile device 602 via a wireless connection and there may be a requirement that a software module or application is running on the host device 605 to provide services to the mobile device 602.

In some examples, wireless device 608 has the following characteristics for WFPS location data 616, which is based on triangulation based on signal strength or time-of-flight in transmitting and receiving packets between two or more wireless devices 608 and the mobile device 602; there is a higher accuracy with some of the communication protocols used; there is a medium latency, which is based on sending and receiving packets between the mobile device 602 and the wireless device 608; there is a lower amount of power consumed; often, the protocol to determine WFPS location data 616 is only available indoors; and, there is a requirement for availability of the wireless communication protocol. In some examples, information regarding the locations of wireless devices 608 is needed to receive or determine location data 616. For example, the location of APs is needed for some WFPS location data 616 and the location of the APs is stored in a database accessible via the internet. The database of APs may include billions of mapped wireless networks, which may be termed WiFi networks. The storage of the information regarding the mapped WiFi networks is not feasible on the mobile device 602 because of storage, processing, and update requirements. Access to the internet may provide the information needed to perform WFPS without the large storage needs. In some examples, the host device 605 provides the information regarding the mapped WiFi networks to the mobile device 602. The host device 605 is a client device 102, in accordance with some examples.

In some examples the wireless device 608 uses other protocols to determine the location data 616 or to enable the mobile device 602 to determine the location data 616. In some examples, the wireless device 608 is used to receive or determine other types of location data 616. For example, location protocols of 5G network, IEEE 802.11az, proprietary protocols, and so forth, are used to determine location data 616. In some examples, the wireless device 608 is configured to operate in accordance with wireless communications protocols such as IEEE 802.11, IEEE 802.11az, IEEE 802.11be, and so forth. The wireless device 608 acts as an access point (AP), station (STA), or base station, in accordance with some examples.

In some examples, accessing the PDR sensor 610 to determine PDR location data 618 has the following characteristics: location data 618 from the PDR sensor 610 can be used to detect motion of the mobile device 602; the accuracy of the PDR location data 618 has a lower accuracy since it is based on dead reckoning; the latency is lower since the PDR sensor 610 is part of the mobile device 602; the power requirement is lower since the PDR sensor 610 requires a lower amount of energy to operate than other location devices such as the GNSS receiver 720; the PDR sensor 610 works both indoors and outdoors; and, location data 612 needs to be supplemented since it provides only an offset from a last known location in terms of distance and direction, and the PDR sensor 610 needs strong or high signal to noise conditions to operate properly.

When the PDR sensor 610 detects motion, the motion is then used to determine if there has been a change in location, in accordance with some examples. For example, the PDR sensor 610 may detect motion that indicates the mobile device 602 was moved to the left and then moved to the right so that it is in the same location. The accuracy of PDR varies depending on a wearer gait and step length calibration being known and an activity such as walking, running, and so forth, to be determined, in accordance with some examples.

The location sources provide location data 612, 614, 616, 618 to the mobile device 602, where the location data 612, 614, 616, 618 indicates data related to the location of the mobile device 602. In some examples, the location data 612, 614, 616, 618, includes one or more of the location data components as described in Table 2. The location data 612, 614, 616, 618 is 2 dimensional (D), 3D, 4D, or 5D in accordance with some examples. For example, altitude and locality are not included in some location data 612, 614, 616, 618.

TABLE 2

Location Data Components

| Location Data Field | Contents of location data field |
| --- | --- |
| Latitude | [+−] DDD.DDDDD format where D indicates degrees. |
| Longitude | [+−] DDD.DDDDD format where D indicates degrees. |
| Accuracy | Estimated horizontal accuracy of this location. For example, plus or minus a number of meters. |
| Timestamp | Timestamp of the last known location fix in epoch time. The timestamp may be in Universal Time Coordinated (UTC) or another format. |
| Altitude | In some examples, an altitude in meters above a wideband global satellite (WGS) reference ellipsoid. |
| Locality | For example, city, state, and/or country. For example, "New York, New York, United States". |

The PDR sensor 610 provides a 2-dimensional (2D) offset, heading, and step count from a starting position, in accordance with some examples. In some examples, the PDR sensor 610 operates continuously and therefore is useful to fill in the gaps between updates from the other positioning system that require more power or have a higher latency.

In some examples the location data 612, 614, 616, 618 is not sent after the positioning system has received the request 620. For example, a location source such as the PDR sensor 610 may not be operating properly, so it may not respond to the request 620. The positioning system may not respond with location data 612, 614, 616, 618 because one of its requirements is not met. See for example, the requirements column in Table 1. Additionally, internet access or quality may be too low for a location source such as wireless device 608 to operate. The host device 605 does not provide location data 614 unless the mobile device 602 is paired with the host device 605, in accordance with some examples. For example, the host device 605 and the mobile device 602 may not have a BlueTooth™ connection or the quality of the wireless connection may be too poor to transmit data for the mobile device 602 to pair with the host device 605. The host device 605, in some examples, provides location data 614 from another source. For example, the host device 605 determines its own location using a wireless device 608 or GNSS satellite 604 and then transmits the location data 614 that indicates a location of the host device 605 to the mobile device 602. The host device 605 may use other location sources to determine its location and send the location to the mobile device 602 in location data 614. In some examples, the host device 605 sends to the mobile device 602 an estimate of how far the mobile device 602 is from the host device 605 so that the mobile device 602 can use the estimate to determine its location based on the estimate of how far the mobile device 602 is from the host device 605 and the location of the host device 605. The estimate of how far the mobile device 602 is from the host device 605 is based on delays in wireless communications between the mobile device 602 and the host device 605, in accordance with some examples. The estimate is based on a strength of a received signal strength indicator (RSSI) of the received signal along with an indication of a power with which the signal was transmitted. The mobile device 602 or host device 605 estimates a distance based on the transmitted power used to transmit the signal and the RSSI, which is the power of the received signal.

The host device 605 sends data to the mobile device 602 to assist it in performing GNSS satellite 604 operations. For example, the host device 605 sends almanac information to the mobile device 602 for performing GPS estimates so that the mobile device 602 does not have to download the almanac information from the GNSS satellite 604. In some examples, the host device 605 sends other information such as information about APs in an IEEE 802 network or base stations in a 3GPP or 5G network.

In some examples, the location sources provide location data 612, 614, 616, 618 that provides a location of the mobile device 602 without consideration for an orientation of the mobile device 602. Additionally, location sources that are part of the mobile device 602 provide orientation information to the mobile device 602, in accordance with some examples. In some examples, the PDR sensor 610 provides additional location data that includes an orientation of the mobile device 602. In some examples, the mobile device 602 uses location data 612, 614, 616, 618 for changes in geographic location and uses other devices for determining an orientation of the mobile device 602.

Figure 7:
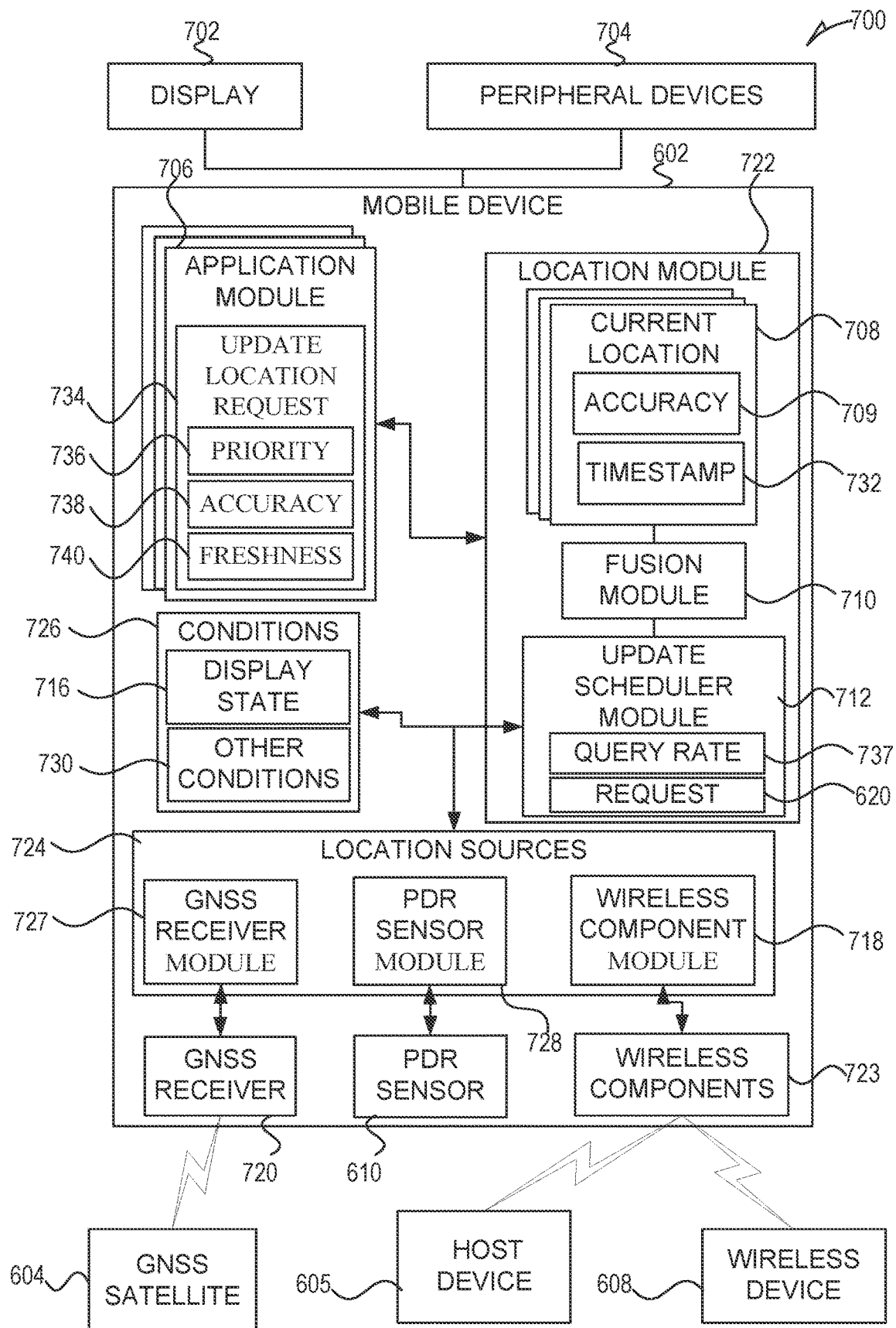
FIG. 7 illustrates a system for determining location using multi-source geolocation data 700, in accordance with some examples.

FIG. 7 illustrates a system 700 for determining location using multi-source geolocation data, in accordance with some examples. Illustrated in FIG. 7 is a mobile device 602 having a display 702 and peripheral devices 704, in accordance with some examples. The display 702 is a display as described herein and the peripheral devices 704 include sensors, speakers, the PDR sensor 610, the GNSS receiver 720, wireless components 723, and so forth as described herein. The mobile device 602 is a client device 102, in accordance with some examples. In accordance with some examples, the mobile device 602 is the glasses 1100 of FIG. 11, which may be AR glasses. The mobile device 602 is a wearable device, in accordance with some examples.

In some examples, the location data 612 is received by GNSS receiver 720 and processed by GNSS receiver module 727. In some examples, the location data 614 from host device 605 is received by wireless components 723 and processed by wireless component module 718. In some examples, the location data 616 from wireless device 608 is received by wireless components 723 and processed by wireless component module 718. In some examples, the location data 618 is generated by PDR sensor 610 and processed by PDR sensor module 728.

Application modules 706 are applications such as AR applications or other applications that use the current location 708 of the mobile device 602. The application modules 706 access the current location 708, accuracy 709, timestamp 732, and other associated data, and determine whether the current location 708 is sufficient. If the current location 708 is not sufficient, then the application module 706 submits an update location request 734 to the location module 722. The update location request 734 optionally indicates a priority 736 of the need for the current location 708 to be updated. The update location request 734 optionally includes an indication of a needed accuracy 738 and freshness 740 of the current location 708.

Figure 11:
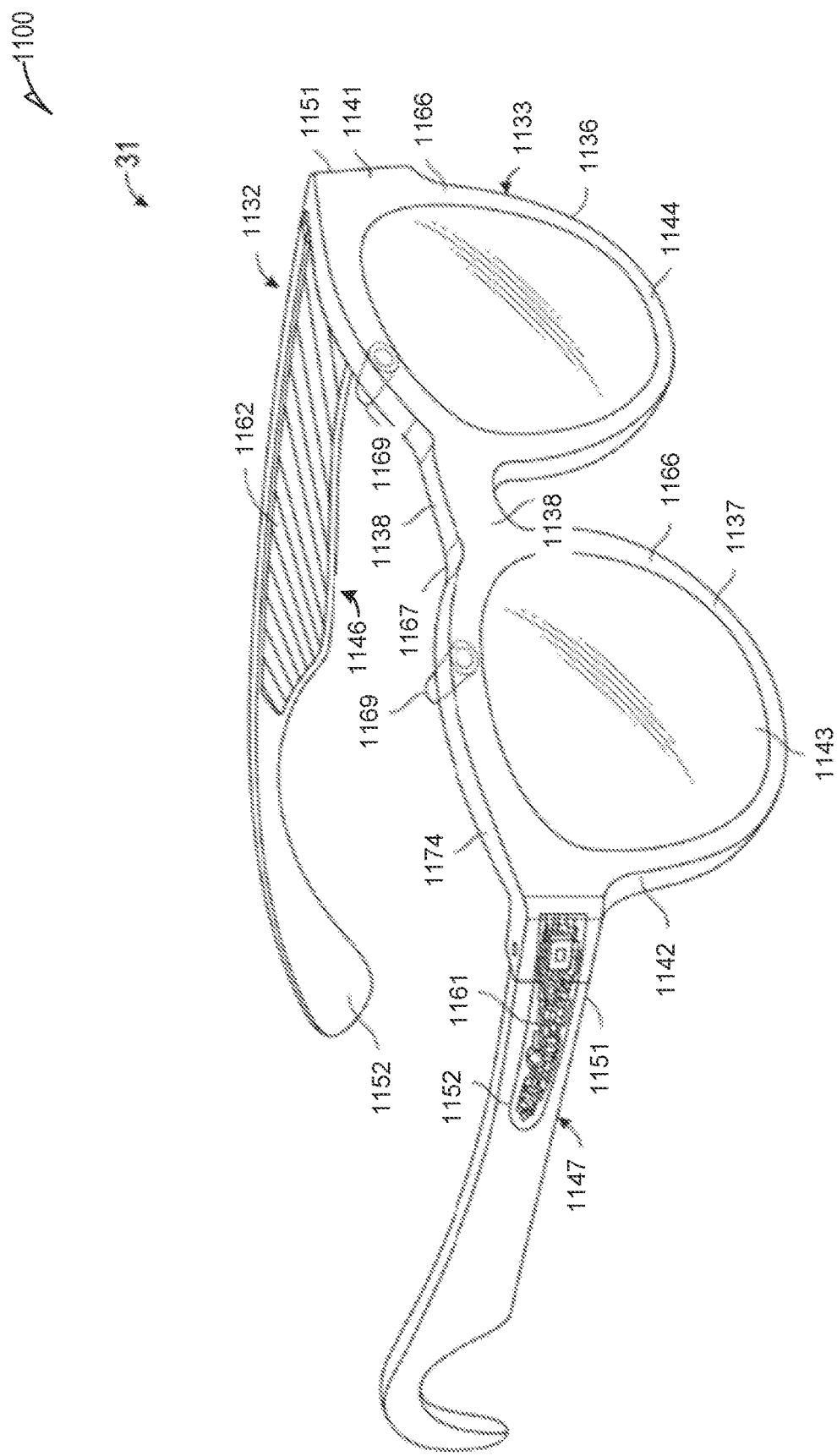
FIG. 11 illustrates examples of a wearable electronic device in the form of electronics-enabled glasses, in accordance with some examples.

An example application module 706 is an application that projects directions on optical elements 1143, 1144 of AR glasses of FIG. 11. The current location 708 may include a number of fields or data associated with the current location 708 such as an accuracy 709 and timestamp 732 or other data such as is illustrated in Table 2 location data components. In some examples, an application module 706 may be associated with a camera such as camera 1169 of FIG. 11 and when a video or photo is captured, then the application module 706 may use the current location 708 or send an update location request 734 to the location module 722.

The wireless components 723 are configured to communicate with host device 605 and wireless device 608 through a wireless connection. The wireless connection may be a slow speed connection such as Bluetooth® or a higher-speed communication protocol such as IEEE 802.11, 3GPP, 5G, WiFi, cellular network modem, or another communications protocol. In some examples, the wireless component module 718 is configured to perform WFPS with one or more wireless devices 608 to provide positioning information based on triangulation. In some examples, the wireless devices 608 are two or more APs configured to operate in accordance with IEEE 802.11az to determine the location of the mobile device 602. Other positioning protocols are associated with 3GPP and proprietary protocols are available, which include other wireless devices 608 that are near to the mobile device 602 to provide location information such as a home transmitter location system. In some examples, the wireless components 723 operate with light where the peripheral devices 704 include a light sensor.

In some examples, the wireless component module 718 scans for APs and their addresses such as a basic service set (BSS) identification (IDs) (BSSIDs), signal strength, frequency, and home channel. The wireless component module 718 may perform the scans in response to an application module 706 sending an update location request 734 to the location module 722. In some examples, the host device 605 performs the scan and transmits the information or part of the information to the mobile device 602. In some examples, the scan does save a service set (SS)(SSID) of a collection of wireless devices 608. The information sent by the host device 605 to the mobile device 602 includes a list of APs, in accordance with some examples. In some examples, the host device 605 provides an application programming interface (API) to the mobile device 602. For example, getGeoLocationFromWFPS( ) method, where the mobile device 602 provides an AP token to the host device 605 via the API; and, the host device 605 returns a location of the AP corresponding to the AP token to the mobile device 602. The host device 605 may be co-located or nearly co-located with the mobile device 602. For example, the host device 605 may be a smart phone and the mobile device 602 may be AR glasses. In some examples, the wireless components module 718 determines a location from the host device 605 based on delays in wireless signals exchanged between the two wireless devices and uses the determined location to correct for a location given by the host device 605. For example, the host device 605 sends a current location to the mobile device 602 and the mobile device 602 determines that it is within a meter of the host device 605.

The current location 708 can be estimated based on exchanging light. For example, the mobile device 602 exchanges light with another device and a delay in receiving a response along with a time to process and transmit the response is used to determine a distance from the other device. Triangulation is used if there is more than one other device or light sensor with which the mobile device 602 may exchange light. The GNSS receiver 720 communicates with GNSS satellite 604. The location module 722 is a centralized entity for acquisition, management and aggregation of current location 708 data. The services provided by the location module 722 are termed location services for the application modules 706, in accordance with some examples.

In some examples, the location module 722 maintains a current location 708 and schedules updates for the current location 708 so that the current location 708 is available upon request from an application module 706. In some examples, the location module 722 responds to update location requests 734 for a current location 708 by sending a request for the update scheduler module 712 to make a request 620 for location data 612, 614, 616, 618 to a location source of the location sources 724. The update schedule module 712 makes a request 620 for location data 612, 614, 616, 618 via GNSS receiver module 727, PDR sensor module 728, or wireless component module 718, in accordance with some examples.

In some examples, the update scheduler module 712 does not send a request 620 to one of the location sources 724 when the application module 706 requests the current location 708. The update scheduler module 712 represents an update location request 734 as a deferrable work item that is scheduled to be executed whenever the conditions 726 indicate a request 620 should be sent to one of the location sources 724. The conditions 726 depends on the location source 724 to be used. The conditions 726 include conditions that indicate the likelihood of obtaining the location data 612, 614, 616, 618, conditions that indicate a current system load such as display state 716, conditions for use of Table 1, and other conditions 730.

Other conditions 730 includes one or more of the following: a WiFi status, a wireless status of the wireless components 723, a user account and pairing status with the host device 605, an overall system load of the mobile device 602, a status of the battery of the mobile device 602, other conditions 730 that are described in conjunction with Tables 2 and 4, a status of the GNSS receiver 720, a status of the PDR sensor 610, and a velocity of the mobile device 602 that may be categorized as a mode of transportation such as walking, running, biking, flying, riding a train, riding a bus, driving, and so forth. In some examples the wireless components module 718 is configured to determine location data using an IP address location, which requires access to the internet where a server provides location data based on the IP address of the mobile device 602. The location data based on the IP address may be a location such as part of a university or within a city.

One or more of the location sources 724 is not available some or most of the time, in accordance with some examples. Some location sources 724 are available more often than others. For example, location data 614 from a paired host device 605 is accurate but not always available because it requires the mobile device 602 to be paired with the host device 605. In some examples, the host device 605 needs to be running a software application that provides the location to the host device 605. Table 4 provides additional information regarding the location sources 724.

TABLE 4 location sources 724

| Location Source | Performance | Example Data Structure |
|---|---|---|
| GNSS satellite 604 | High power; may need peripherals to be off such as the display. May need the mobile device 602 to be outside. Often implemented in firmware. | Location fix success location_data { latitude: 52.5069704 longitude: 13.2846531 speed_mps: 0 utc_time: 1591721135 } gps_statistics { got_location: true fix_time_ms: 247419 num_sv: 3 } |
| WFPS | Needs access to other wireless devices 608 such as APs. Needs internet access in accordance with some examples. May be implemented by a proxy on the host device to protect privacy. | |
| PDR Sensor 610 | Accuracy depends on a known step length and heading, in accordance with some examples. Often requires special purpose chips to access communication protocols. | |
| host device 605 | Requires coupling with host device 605 and active wireless connection. In some examples requires an application on the host device 605 to be active. Often requires implementation of Bluetooth ® | |

TABLE 4-continued location sources 724

| Location Source | Performance | Example Data Structure |
|---|---|---|
| IP address location | Requires connection with the internet. A WiFi chip is needed. In some examples special purpose chips are needed to access communication protocols or software/firmware is needed with a WiFi chip. | "ip": "91.66.5.35", "city": "Berlin", "region": "Land Berlin", "region_code": "BE", "country": "DE", "country_code": "DE", "country_code_iso3": "DEU", "country_capital": "Berlin", "country_tld": ".de", "country_name": "Germany", "continent_code": "EU", "in_eu": true, "postal": "10317", "latitude": 52.5155, "longitude": 13.4062, "timezone": "Europe/Berlin", "utc_offset": "+0200", "country_calling_code": "+49", "currency": "EUR", "currency_name": "Euro", "languages": "de", "country_area": 357021.0, "country_population": 81802257.0, "asn": "AS31334", "org": "Vodafone Kabel Deutschland GmbH" } |

When the mobile device 602 starts, the location module 722 satisfies an initial update location request 734, by attempting to query all the location sources 724, in accordance with some examples. In some examples, the location module 722 prioritizes the location sources 724 and selects the highest priority location source where the conditions 726 are met for sending a request 620 to the location source. The location module 722 continues down the priority list until location data 612, 614, 616, 618 is received that meets the conditions of the update location request 734 such as an needed accuracy 738 that is below a threshold and freshness 740 that is below a threshold.

In some examples, after a first current location 708 is determined, subsequent location data 612, 614, 616, 618, is integrated as follows. The update scheduler module 712 dynamically adjusts the query rate 737 of the location sources 724 based on the velocity of the mobile device 602. The update schedule module 712 uses PDR sensor 610 via PDR sensor module 728 to determine if the mobile device 602 is stationary. The update schedule module 712 uses the PDR sensor 610 to determine if the mobile device 602 is stationary but the orientation is changing such as when the mobile device 602 is an AR device and a user is using the AR device. In some examples, the update schedule module 712 does not update the current location 708 when the mobile device 602 is stationary but the orientation is changing.

In some examples, the update scheduler module 712 increases the query rate 737 based on the velocity of the mobile device 602, which is being used by a user. In some examples, the update scheduler module 712 selects a location source of the location sources 724 to minimize or lessen a power usage used to determine the current location 708 where the location source of the location sources 724 meets conditions needed for updating the current location 708. For example, the location module 722 may receive an update location request 734 that indicates an accuracy of one meter and the accuracy returned by IP address location is 100 meters. In this case, the update schedule module 712 would not use IP address location.

In some examples, the update schedule module 712 performs staggered requests 620 for location data 612, 614, 616, 618 to avoid causing spikes in power usage. In some examples, the update schedule module 712 schedules requests 620 to be performed when the mobile device 602 is not in a sleep or doze interval, which may extend a battery life of the mobile device 602.

In some examples, the update schedule module 712 schedules requests 620 to be performed when the operating system of the mobile device 602 is in a maintenance window. The mobile device 602 is in a power on state during the maintenance window so the mobile device 602 does not need to power-up or go to a regular power state when sending the requests 620.

In some examples, the update schedule module 712 schedules a request 620 to one of the location sources 724 where the request 620 is sent to the location source when the conditions 726 are met for sending the request 620 to the location source and the location source will provide location data that meets the requirements associated with the update location request 734. Since new location data 612, 614, 616, 618 is fused by fusion module 710 with the current location 708, the determination of whether the location source will provide location data that meets the requirements associated with the update location request 734 is based on the current location 708, the update location request 734, and the location data 612, 614, 616, 618.

In some examples, the update schedule module 712 will send a request 620 to a location source based on the conditions 726 being met, and then cancel the request 620 if a condition 726 is no longer met. For example, if a user of the mobile device 602 starts interacting with the mobile device 602 that changes the display state 716 to on, the update schedule module 712 cancels a request 620 where a condition 726 of the location source was that the display state 716 was off.

The fusion module 710 fuses together two or more location data 612, 614, 616, 618 or the current location 708 with location data 612, 614, 616, 618 to determine an updated current location 708. The fusion module 710 uses Equation (1) to determine the updated current location 708, in accordance with some examples. In some examples, the fusion module 710 is configured to perform the method 800 of FIG. 8.

The current location 708 and location data 612, 614, 616, 618 are aggregated and converted into a common set of parameters or a common coordinate system before being fused. The location data 612, 614, 616, 618 includes one or more components indicating a location such as described in Table 2 Location Data Components.

The altitude and locality are included in some location data 612, 614, 616, 618, so location data 612, 614, 616, 618 may need to be fused or combined when some location data 612, 614, 616, 618 includes the altitude or locality and other location data 612, 614, 616, 618 does not include altitude or locality.

The update schedule module 712 schedules requests 620 that may be sent in the background. As the mobile device 602 moves around, location data 612, 614, 616, 618 updates are being received in the background. Depending on system resources availability, some, or all of the location sources 724 will be periodically queried with a request 620. The fusion module 710 is initialized with a first current location 708 upon power-up of the mobile device 602. Subsequent location data 612, 614, 616, 618 updates are fused with the current location 708 to generate an updated current location 708. The update scheduler module 712 is configured to perform the method 1000 of FIG. 10, in accordance with some examples. Table 3 Location States indicates the location availability to a paired application module on the host device 605 and location availability to an application Module 706.

TABLE 3

Location States

| Host Device 605 location services | Mobile device 602 Location Services | Location Available on a Paired Application Module on the Host Device 605 | Location Available to Application Module 706 |
|---|---|---|---|
| Disabled | Disabled | Not available | Not available |
| Enabled | Disabled | Available | Available to application modules on the Host Device 605 |
| Disabled | Enabled | Not available | Available using a location resource of the location sources 724 available without assistance from host device 605 |
| Enabled | Enabled | Available | Available and available from host device 605 |

Figure 8:
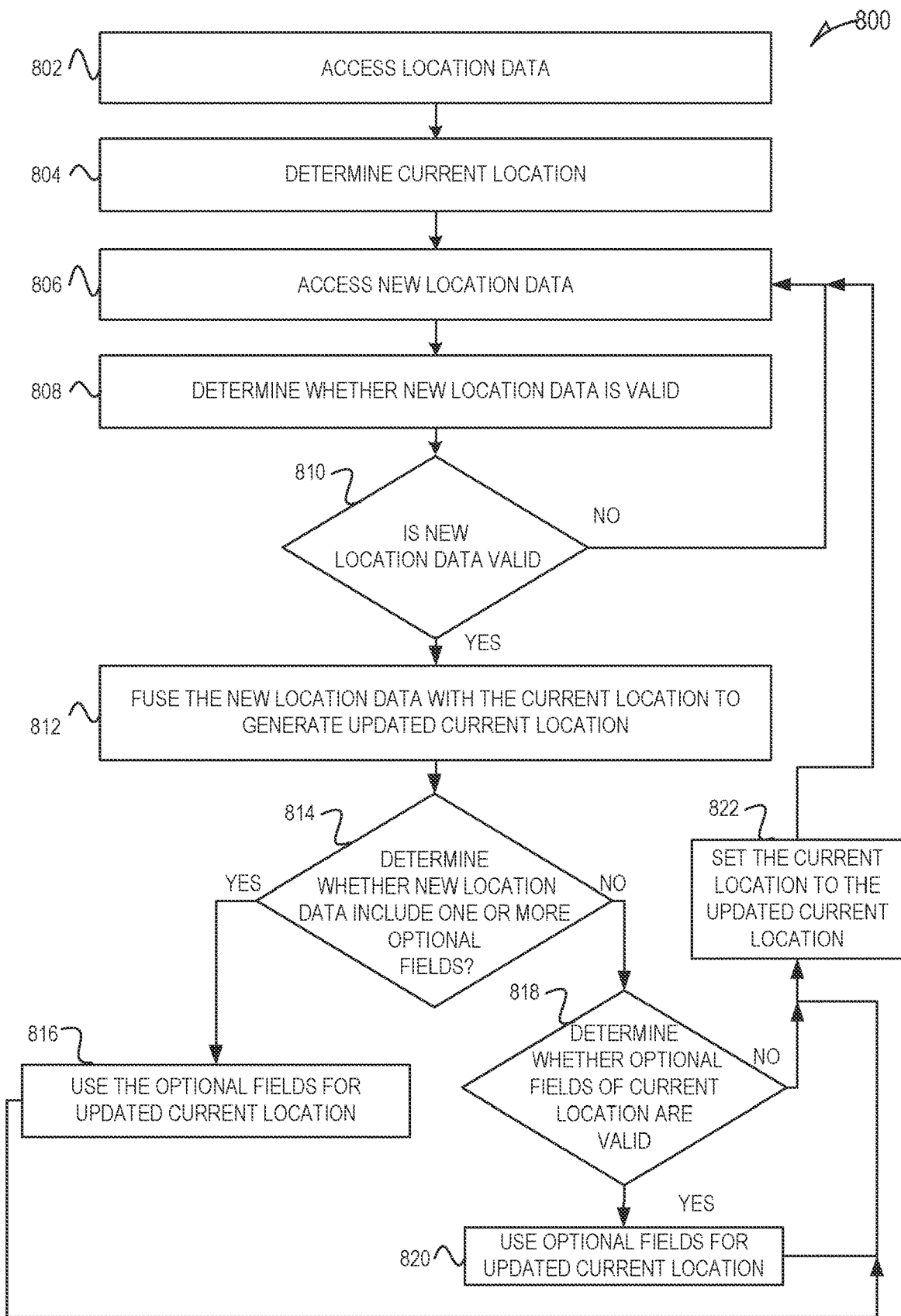
FIG. 8 illustrates the operation of a method to fuse locations, in accordance with some examples.

FIG. 8 illustrates the operation of a method 800 to fuse locations, in accordance with some examples. The fusion module 710 is configured to perform the method 800, in accordance with some examples. The method 800 begins at operation 802 with accessing location data. For example, the fusion module 710 receives location data 612, 614, 616, 618 from the update scheduler module 712. In some examples, the fusion module 710 sends a command to the update scheduler module 712 that this is the first current location 708 being determined. The update schedule module 712 then sends requests 620 to one or more location sources 724 to obtain location data 612, 614, 616, 618, in accordance with some examples. The method 800 continues at operation 804 with determining a current location. For example, fusion module 710 uses the location data 612, 614, 616, 618 to determine the current location 708 without fusing if it is the first location data 612, 614, 616, 618. The fusion module 710 may use the location data 612, 614, 616, 618 as received or convert it to a different representation, in accordance with some examples. Example representations of the location data 612, 614, 616, 618 include Cartesian coordinates, polar coordinates, splines, Ellipsoidal coordinates, Prolate spheroidal coordinates, GPS (global positioning system) coordinates expressed as the combination of latitude and longitude, and so forth.

The method 800 continues at operation 806 with accessing new location data. The fusion module 710 responds to the receipt of new location data 612, 614, 616, 618 by accessing the new location data 612, 614, 616, 618. In some examples, the fusion module 710 delays its response until a power save mode is over or until a power usage level of the mobile device 602 falls below a threshold. The method continues at operation 808 with determining whether the new location is valid. For example, an estimated velocity is determined based on the new location data 612, 614, 616, 618, the current location 708, and a time difference as indicated by timestamps associated with the new location data 612, 614, 616, 618, and the current location 708. If the estimated velocity does not transgress a threshold value for a use case, then the new location data is valid, otherwise the new location data is deemed invalid and is discarded. The use case is an estimate of an activity that a user of the mobile device 602 is doing such as being stationary, running, bicycling, riding a train, riding a bus, walking, flying in a plane, driving, and so forth. The use case is determined based on previous estimated velocities, in accordance with some examples. Other methods of determining whether the new location data 612, 614, 616, 618 is valid may be used.

The method 800 continues at operation 810 with checking if the new location data valid. If the new location data is not valid, then the fusion module 710 returns to operation 806 and waits for or processes new location data 612, 614, 616, 618.

If the new location data is valid, then the method 800 continues at operation 812 with fusing the new location data with the current location to generate updated current location. The new location data 612, 614, 616, 618 and current location 708 are fused based on a weighted sum of the two, in accordance with some examples. In some examples, Equation (1), shown below, is used to determine a fused or updated current location 708 based on the current location 708 being location1 and the new location data 612, 614, 616, 618 being location2.

Equation (1): $x,y,z = ((x1, y1, z1) * (1/accuracy1) + (x2, y2, z2) * (1/accuracy2))/(delta\ distance)$, where x, y, z, are the coordinates of a fused current location 708 that is being determined; x1, y1, z1 are the coordinates of a location1, which is the last determined current location 708; x2, y2, z2 are the coordinates of a location2, which is the new location data 612, 614, 616, 618; accuracy1 is the accuracy of location1; accuracy2 is the accuracy of location2; and delta distance is an estimated distance or Euclidean distance the mobile device 602 has moved between the location1 and the location2. In some examples, "*" is termed multiply or times and represents the mathematical operation of multiplication. X may be referred to as an x value; y may be referred to as a y value; x1 may be referred to as a x1 value; z may be referred to as a z value; y1 may be referred to as a y1 value; z1 may be referred to as a z1 value; z2 may be referred to as a z2 value; y2 may be referred to as a y2 value; and, x2 may be referred to as an x2 value.

The method 800 continues at operation 814 with determining whether the new location data includes one or more optional fields. The location data may include an altitude or locality as optional location data, in accordance with some examples. Table 2 shown above lists some of the fields that may be included in the location data.

When the new location data does not include optional fields, the method 800 continues at operation 818 with determining whether optional fields of the current location are valid. For example, if the new location data 612, 614, 616, 618 does not have an altitude but the current location 708 does, then the mobile device 602 uses the current altitude value from the current location 708 in the fused or updated current location if the altitude is still valid. Whether the altitude is still valid may be determined as follows: if a distance between the new location data 612, 614, 616, 618 and the current location 708 is less than a threshold where the threshold may be 100 meters or another number such as 1 meter to 10000 meters, then the previous current altitude value is valid and used as the current altitude value in the updated current location; otherwise, the system sets the altitude value of the updated current location to unknown, which may be represented with a null value. In some examples the optional fields of the current location are determined as valid or invalid based on the timestamp 732 of the current location 708. For example, if the current location 708 was determined more than a threshold number of minutes ago, then the optional data of the current location 708 is not used. In some examples, the term transgresses is used to indicate that a value is greater than a threshold value. In some examples, other conditions are used to determine whether the optional fields are valid. In some examples, a combination of conditions is used to determine if the optional fields are valid. For example, a combination of the change in distance from the updated current location and the current location, and a time in seconds between determining the updated current location and the current location may be used. Location or current location may be referred to as a location value or current location value.

In one example, the fusion module 710 fuses locality, such as a street, a city, a state, or a country as follows. If the new location data 612, 614, 616, 618 does not have locality but the current location 708 does, then the system uses the locality from the current location 708 in the updated current location 708 based on the following. If a distance between the new location data 612, 614, 616, 618 and the current location 708 is less than a threshold where the threshold may be may be 100 meters or another number such as 1 meter to 10000 meters, the mobile device 602 uses the locality from the current location 708, otherwise, the mobile device 602 indicates the locality of the fused or updated current location is unknown, which may be represented with a null value. The validity of the optional fields may be determined in another manner. The threshold for the locality is based on the type of locality, in accordance with some examples. For example, a locality of a street may have a threshold of 10 meters and a city may have a threshold of 1000 meters.

If the optional fields of the current location are valid, then the method 800 continues to operation 820 with using the optional fields to update the current location. The optional fields are used for the updated current location as described above. The method 800 then continues to operation 822. If the optional fields of the current location are not valid, then the updated current location optional fields are set to unknown or null as described above. The method 800 then continues to operation 822.

When the new location data does include an optional field, then the method 800 continues at operation 816 and the system uses the optional field for the updated current location. For example, if new location data 612, 614, 616, 618 contains altitude, the system uses the altitude for the updated location data 612, 614, 616, 618. In another example, if new location data 612, 614, 616, 618 contains locality, the system uses the locality for the updated location data 612, 614, 616, 618.

The method 800 continues from operations 816 and 820 to operation 822 with setting the current location to the updated current location. For example, the current location 708 is set to the updated current location that was determined by performing method 800.

One or more of the operations of method 800 may be optional. For example, operations 814-820 may be optional. Method 800 may include one or more additional operations. The operations of method 800 may be performed in a different order.

Figure 9:
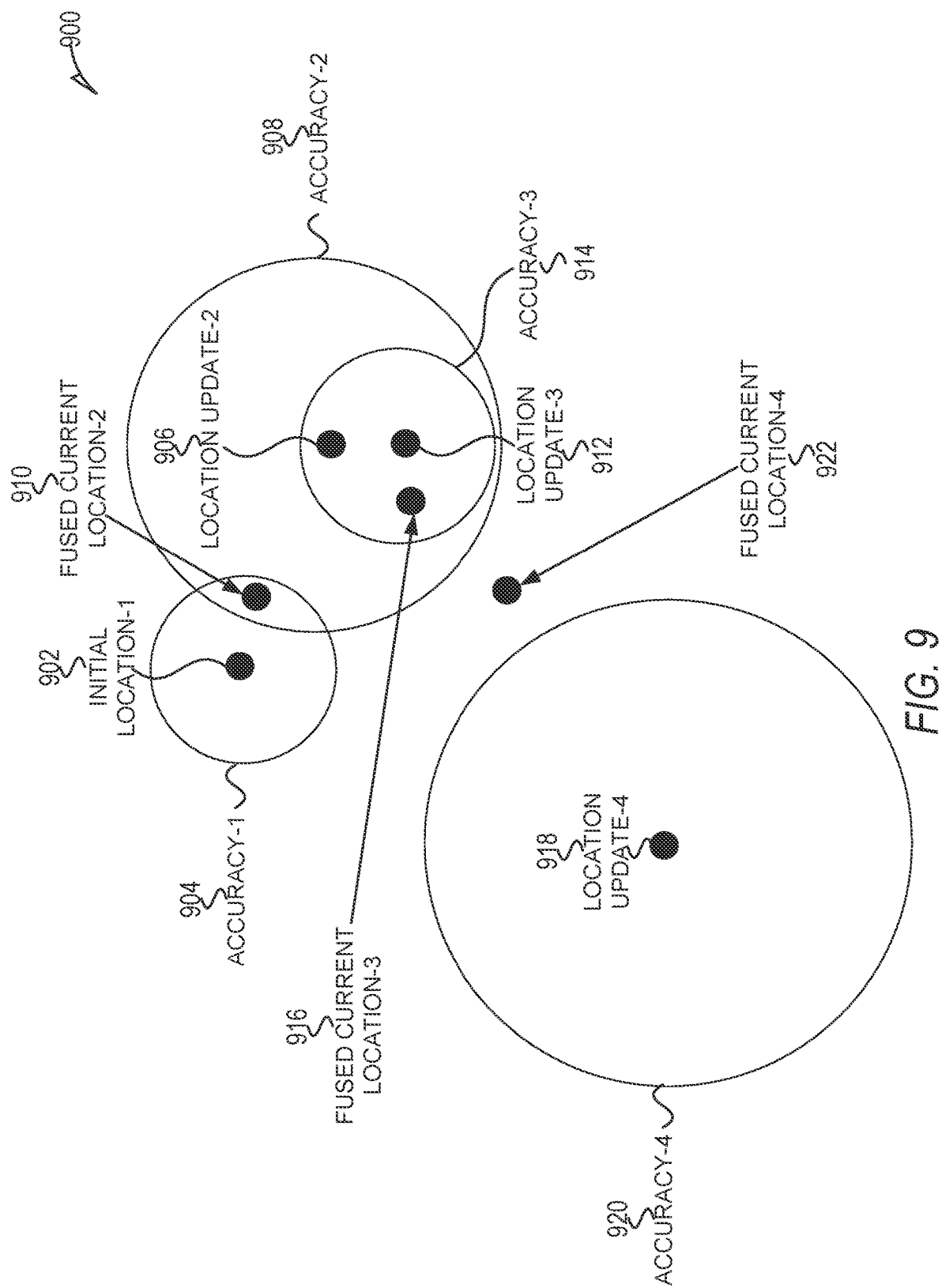
FIG. 9 illustrates an example of fusing location data, in accordance with some examples.

FIG. 9 illustrates an example 900 of fusing location data, in accordance with some examples. In the example 900 the mobile device 602, using the methods described herein, moves around and determines a current location 708, such as initial location-1 902, fused current location-2 910, fused current location-3 916, and fused current location-4 922, where the current location 708 is determined based on receiving location updates such as initial location-1 902, location update-2 906, location update-3 912, and location update-4 918.

The example 900 begins with receiving location data and determining initial location-1 902. For example, operations 802 and 804 of method 800 may be performed on new location data received when the mobile device 602 starts up or when the mobile device 602 wakes up from a sleep period. The accuracy-1 904 indicates an accuracy that is associated with the initial location-1 902.

The example 900 continues at location update-2 906 where new location data is received with an associated accuracy-2 908. A fused current location-2 910 is determined by the fusion module 710. For example, the fusion module 710 may perform method 800 to determine fused current location-2 910 using Equation (1) above with location1 being initial location-1 902 and location2 being location update-2 906. The example 900 continues at location update-3 912 where new location data is received with an associated accuracy-3 914. A fused current location-3 916 is determined by the fusion module 710. For example, the fusion module 710 may perform method 800 to determine fused current location-3 916 using Equation (1) above. The example 900 continues at location update-4 918 where new location data is received with an associated accuracy-4 920. A fused current location-4 922 is determined by the fusion module 710. For example, the fusion module 710 may perform method 800 to determine fused current location-4 922 using Equation (1) above. The initial location-1 902, location update-2 906, location update-3 912, and location update-4 918 are location data 612, 614, 616, 618 that are received in response to the update scheduler module 712 sending a request 620, in accordance with some examples.

Figure 10:
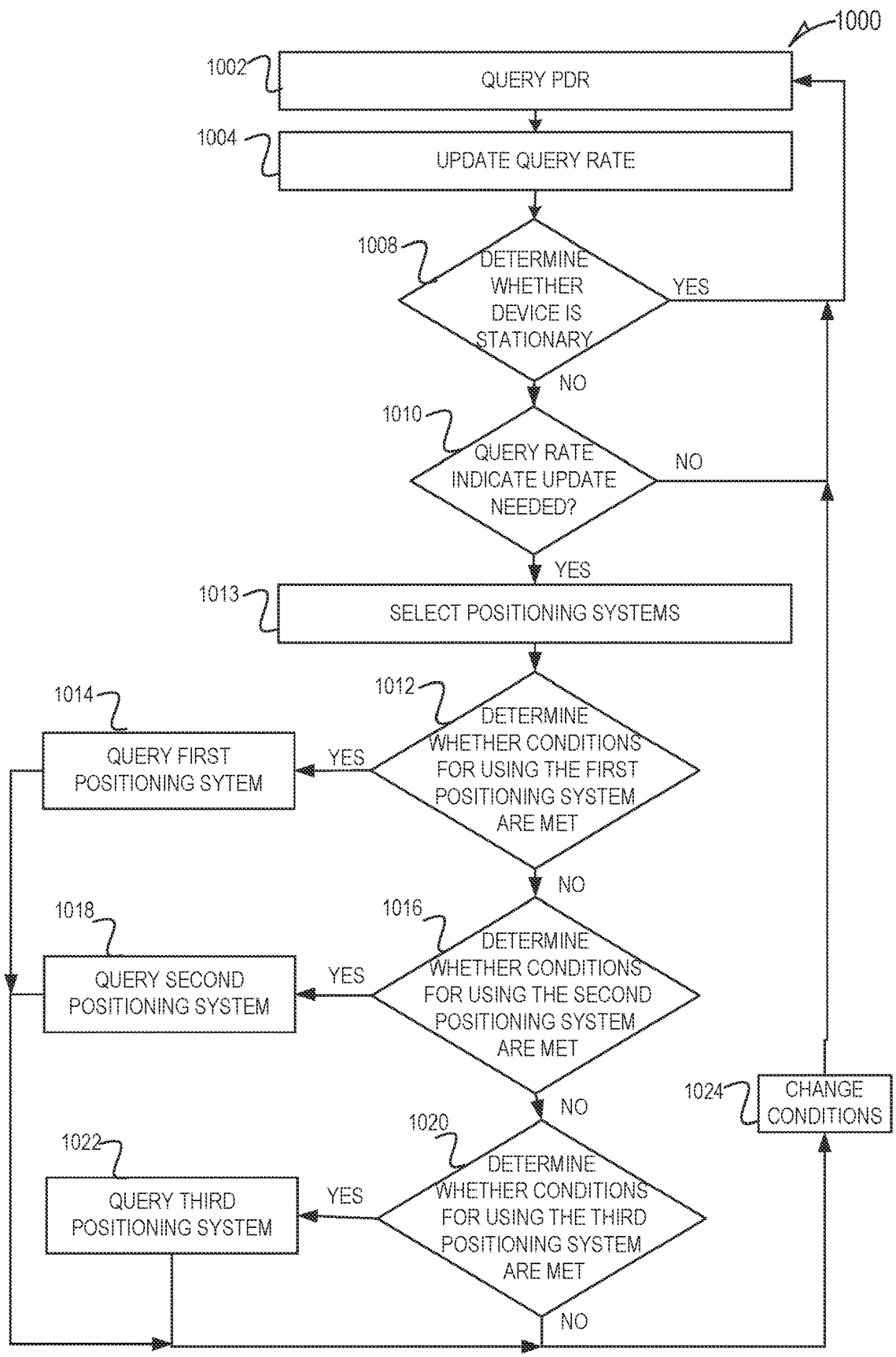
FIG. 10 illustrates a method for scheduling requests, in accordance with some examples.

FIG. 10 illustrates a method 1000 for scheduling requests, in accordance with some examples. In some examples, the update scheduler module 712 is configured to perform method 1000. The method 1000 begins at operation 1002 by querying the PDR. For example, the update schedule module 712 may periodically query the PDR or query the PDR sensor module 728 for PDR sensor 610 location data in response to an event such as a system start-up or end of a sleep command. The location data 618 from the PDR sensor 610 indicates whether the mobile device 602 has moved since a last query. The method 1000 continues at operation 1004 with updating a query rate. For example, the update schedule module 712 maintains a query rate 737 that indicates how often requests 620 should be sent to one of the location sources 724. The query rate 737 indicates how often method 1000 is performed, in accordance with some examples. In some examples, the query rate 737 indicates how often an update to the current location 708 should be performed. In some examples, the query rate 737 is not updated each time the PDR is queried. In one example, the query rate 737 may be increased or decreased if the PDR location data 618 indicates a faster or slower speed, respectively, of the mobile device 602 than indicated by previous PDR location data 618.

The method 1000 continues at operation 1008 with determining if the device is stationary. If the location data 618 from the PDR sensor 610 indicates that the mobile device 602 is stationary, then the method 1000 returns to operation 1002. There may be a pause or delay so that the query PDR operation 1002 is not constantly performed. In some examples, the operation 1002 is performed based on interrupts or a combination of interrupts and a loop with a pause or delay. For example, interrupts from the operating system such as start-up or sleep state end, or an interrupt indicating the PDR sensor 610 has new or a change in location data 618.

If the mobile device 602 is not stationary, then the method 1000 continues at operation 1010 with determining if the query rate indicates an update is needed. For example, if the query rate indicates that not enough time has passed to query for new location data 612, 614, 616, then the method 1000 returns to operation 1002. If enough time has passed, the method 1000 continues to operation 1012.

In some examples, operation 1010 includes an additional test of whether the current location 708 is sufficient to satisfy an update location request 734 with priority 736, accuracy 738, and freshness 740. For example, a determination is made whether the accuracy 709 of the current location 708 is sufficient to satisfy a pending update location request 734 with a requested accuracy 738 from an application module 706, before determining whether or not to proceed to operation 1012. If the accuracy 709 is not sufficient, then the method 1000 continues to operation 1012.

In some examples, operation 1008 includes an additional condition of whether the mobile device 602 is being worn, before determining whether to proceed to operation 1010. In some examples, if the mobile device 602 is not being worn, then the method 1000 returns to operation 1002. If the system determines that the mobile device 602 is being worn, then the method proceeds to operation 1012.

In some examples, the fusion module 710 updates the current location 708 based on the new location data 618 from the PDR sensor 610 as part of operation 1010. In some example, the test of whether the query rate indicates an update is needed is further based on how much the mobile device 602 has moved based on the location data 618 from the PDR sensor 610.

If the query rate indicates that enough time has passed for another request 620 for new location data 612, 614, 616 then the method 1000 continues at operation 1013 with selecting positioning systems.

Positioning systems include one or more of the following: location sources 724, hardware components that are part of the mobile device 602, and external devices that are needed for determining or receiving location data 612, 614, 616, 618. For example, the positioning system for GNSS satellite location data 612 includes one or more of the following: GNSS satellite 604, the GNSS receiver module 727, and the GNSS receiver 720.

The positioning systems are selected based on one or more of the following: a default ordering of the positioning systems, the current location 708, the update location request 734, a current activity associated with the mobile device 602, a power level of a battery associated with the mobile device 602, conditions 726, and so forth. The order of the positioning systems is selected based on which positioning system can fulfill the location request 734 using the least amount of power, in accordance with some examples. For example, if an accuracy 738 requested by an application module 706 is three feet, then the positioning system that can provide location data 612, 614, 616, 618 with an accuracy 709 within three feet and uses the least power is placed as the first positioning system.

In some examples a default selection of the positioning systems is used to reduce computation time to determine a selection order. In some examples the default section of the position system is used unless an update location request 734 indicates a value that is outside a threshold for the priority 736, accuracy 738, and freshness 740 associated with the default selection of the positioning systems. In some examples operation 1013 is optional. In some examples there is a fixed or set number of positioning systems and the order for testing whether they should be queried is fixed. In some examples another module determines a priority for determining whether to query the positioning systems. The current location 708 is updated with the location data 618 from the PDR sensor 610 so that the method 1000 does not perform operation 1013 when the location data 618 from the PDR sensor 610 satisfies the update location request 734, in accordance with some examples.

In the following, an example ordering of the positioning systems selected by the update scheduler module 712 is wireless device 608, host device 605, and GNSS satellite 604. The method 1000 continues at operation 1012 with determining whether conditions for using the first positioning system are met. The first positioning system is the wireless device 608, in accordance with some examples. For example, the update scheduler module 712 may query the wireless component module 718 if WFPS is available. If WFPS is available, then the method 1000 continues at operation 1014 with querying the first positioning system. For example, a request 620 is sent to the wireless components 723 to perform WFPS with wireless devices 608 to obtain location data 616. The location data 616 is determined by a method performed with one or more other wireless devices using a communication protocol for determining a location as described herein. When the location data 616 is received, then the update scheduler module 712 sends the location data 616 to the fusion module 710 to update the current location 708. When the location data 616 is received, then the update scheduler module 712 sends the location data 616 to the fusion module 710 to update the current location 708. In some examples, the method 1000 returns to operation 1002 from operation 1014. In some examples, the method 1000 continues to operation 1016 from operation 1014. In some examples, the method 1000 continues to operation 1024 from operation 1014.

The wireless device 608 provides other methods of determining the location data 616 as described herein. The different methods each have different conditions and are prioritized by the update scheduler module 712, in accordance with some examples.

If conditions for the first positioning system are not met, the method 1000 continues at operation 1016 with determining whether the conditions for using the second positioning system are met. In examples, the second positioning system is the host device 605 and the condition is whether the mobile device 602 is paired to host device 605. For example, the update scheduler module 712 may query the wireless component module 718 as to whether or not the mobile device 602 is paired with the host device 605. If the mobile device 602 is paired with the host device 605, then the method 1000 continues to operation 1018 with querying the second positioning system. For example, the update scheduler module 712 may send a request 620 for location data 614 to the host device 605. When the location data 614 is received, then the update scheduler module 712 sends the location data 614 to the fusion module 710 to update the current location 708. In some examples, the method 1000 continues from operation 1018 back to operation 1002. In some examples, the method 1000 continues to operation 1020 from operation 1018. In some examples, the method 1000 continues to operation 1024 from operation 1018.

If conditions for using the second positioning system are not met, the method 1000 continues at operation 1020 with determining whether the conditions for using the third positioning system are met. For example, if the mobile device 602 is not paired with the host device 605, then the method 1000 continues at operation 1020 with determining whether conditions for the third positioning system are met. For example, the update schedule module 712 determines if the display is off. If the conditions are met for using the third positioning systems, then the method 1000 continues at operation 1022 with querying the third positioning system. For example, if the display is off, then the method 1000 continues with querying the GNSS. For example, the update scheduler module 712 queries the GNSS receiver module 727 to send a request 620 to the GNSS receiver module 727 to determine location data 612. When the location data 612 is determined, then the update scheduler module 712 sends the location data 612 to the fusion module 710 to update the current location 708. In some examples, the method 1000 continues from operation 1018 back to operation 1002. In some examples, the method 1000 continues to operation 1024 from operation 1022. In some examples there are additional positioning systems.

If the display is not off, then the method 1000 continues to operation 1024 to change conditions. In some examples, the method 1000 continues from operations 1014, 1018, and 1022 to operation 1024 of changing conditions. In some examples, the operation 1024 of changing conditions, changes one or more of the conditions 726 of FIG. 7 based on whether location data 612, 614, 616 was obtained. For example, if no location data 612, 614, 616 was obtained the update scheduler module 712 may request that the display state 716 be changed to off, that the wireless component module 718 pair with the host device 605, or that the wireless component module 718 scan for a wireless device 608 that will perform WFPS with the mobile device 602.

In some examples, the conditions listed in operations 1012, 1016, and 1020 to use the corresponding positioning system operations 1014, 1018 and 1022, respectively, may be different and may include additional conditions as described herein. In some examples, the conditions listed in operations 1012, 1016, and 1020 may include an additional condition, such as a required accuracy before using one or more of the location sources 724. In some examples, the conditions listed in operations 1012, 1016, and 1020 may include an additional condition or different conditions before using the corresponding location source of operations 1014, 1018, 1022.

One or more of the operations of method 1000 may be optional. For example, operations 1020 and 1022 may be optional. Method 1000 may include one or more additional operations. The operations of method 1000 may be performed in a different order. In some examples, method 1000 minimizes the battery and power usage in maintaining a current location 708 with an acceptable accuracy 709 and/or freshness 740.

FIG. 11 illustrates examples of a wearable electronic device in the form of electronics-enabled glasses 1100, in accordance with some examples. The wearable electronic device is an example of the mobile device 602 being in the example form of an article of eyewear constituted by electronics-enabled glasses 1100, which may further operate within a network system for communicating image and video content with associated location information. FIG. 11 illustrates a front perspective view of the glasses 1100. In some examples, the glasses 1100 are termed AR glasses. The mobile device 602 may be termed an AR mobile device 602. The glasses 1100 can include a frame 1132 made from any suitable material such as plastic or metal, including any suitable shape memory alloy. The frame 1132 can have a front piece 1133 that can include a first or left lens, display, or optical element holder 1136 and a second or right lens, display, or optical element holder 1137 connected by a bridge 1138. The front piece 1133 additionally includes a left end portion 1141 and a right end portion 1142. A first or left optical element 1144 and a second or right optical element 1143 can be provided within respective left and right optical element holders 1136, 1137. Each of the optical elements 1143, 1144 can be a lens, a display, a display assembly, or a combination of the foregoing. In some examples, for example, the glasses 1100 are provided with an integrated near-eye display mechanism that enables, for example, display to the user of preview images for visual media captured by cameras 1169 of the glasses 1100.

The frame 1132 additionally includes a left arm or temple piece 1146 and a right arm or temple piece 1147 coupled to the respective left and right end portions 1141, 1142 of the front piece 1133 by any suitable means such as a hinge (not shown), so as to be coupled to the front piece 1133, or rigidly or fixedly secured to the front piece 1133 so as to be integral with the front piece 1133. Each of the temple pieces 1146 and 1147 can include a first portion 1151 that is coupled to the respective end portion 1141 or 1142 of the front piece 1133 and any suitable second portion 1152, such as a curved or arcuate piece, for coupling to the ear of the user. In one example, the front piece 1133 can be formed from a single piece of material, so as to have a unitary or integral construction. In one example, the entire frame 1132 can be formed from a single piece of material so as to have a unitary or integral construction.

The glasses 1100 can include a computing device, such as a computer 1161, which can be of any suitable type so as to be carried by the frame 1132 and, in one example, of a suitable size and shape, so as to be at least partially disposed in one of the temple pieces 1146 and 1147. In one example, the computer 1161 has a size and shape similar to the size and shape of one of the temple pieces 1146, 1147 and is thus disposed almost entirely if not entirely within the structure and confines of such temple pieces 1146 and 1147.

In one example, the computer 1161 can be disposed in both of the temple pieces 1146, 1147. The computer 1161 can include one or more processors with memory, wireless communication circuitry, and a power source. The computer 1161 comprises low-power circuitry, high-speed circuitry, location circuitry, and a display processor. Various other examples may include these elements in different configurations or integrated together in different ways. Additional details of aspects of the computer 1161 may be implemented as described with reference to the description that follows.

The computer 1161 additionally includes a battery 1162 or other suitable portable power supply. In one example, the battery 1162 is disposed in one of the temple pieces 1146 or 1147. In the glasses 1100 shown in FIG. 11, the battery 1162 is shown as being disposed in the left temple piece 1146 and electrically coupled using a connection 1174 to the remainder of the computer 1161 disposed in the right temple piece 1147. One or more input and output devices can include a connector or port (not shown) suitable for charging a battery 1162 accessible from the outside of the frame 1132, a wireless receiver, transmitter, or transceiver (not shown), or a combination of such devices.

The glasses 1100 include digital cameras 1169. Although two cameras 1169 are depicted, other examples contemplate the use of a single or additional (i.e., more than two) cameras 1169. For ease of description, various features relating to the cameras 1169 will further be described with reference to only a single camera 1169, but it will be appreciated that these features can apply, in suitable examples, to both cameras 1169.

In various examples, the glasses 1100 may include any number of input sensors or peripheral devices in addition to the cameras 1169. The front piece 1133 is provided with an outward-facing, forward-facing, front, or outer surface 1166 that faces forward or away from the user when the glasses 1100 are mounted on the face of the user, and an opposite inward-facing, rearward-facing, rear, or inner surface 1167 that faces the face of the user when the glasses 1100 are mounted on the face of the user. Such sensors can include inward-facing video sensors or digital imaging modules such as cameras 1169 that can be mounted on or provided within the inner surface 1167 of the front piece 1133 or elsewhere on the frame 1132 so as to be facing the user, and outward-facing video sensors or digital imaging modules such as the cameras 1169 that can be mounted on or provided with the outer surface 1166 of the front piece 1133 or elsewhere on the frame 1132 so as to be facing away from the user. Such sensors, peripheral devices, or peripherals can additionally include biometric sensors, location sensors, accelerometers, or any other such sensors.

The glasses 1100 further include an example of a camera control mechanism or user input mechanism comprising a camera control button mounted on the frame 1132 for haptic or manual engagement by the user. The camera control button provides a bi-modal or single-action mechanism in that it is disposable by the user between only two conditions, namely an engaged condition and a disengaged condition. In this example, the camera control button is a pushbutton that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1132 adjacent to its surface for detecting the presence of a user's finger, to dispose the touch-sensitive button to the engaged condition when the user touches a finger to the corresponding spot on the outer surface 1166 of the frame 1132. It will be appreciated that the above-described camera control button and capacitive touch button are but two examples of a haptic input mechanism for single-action control of the camera 1169, and that other examples may employ different single-action haptic control arrangements.

The computer 1161 is configured to perform the methods described herein such as method 800, 1000, and 1300. The computer 1161 is an example of mobile device 602, in accordance with some examples. In some examples, the computer 1161 is coupled to one or more antennas for reception of signals from a GNSS and circuitry for processing the signals where the antennas and circuitry are housed in the glasses 1100. In some examples, the computer 1161 is coupled to one or more wireless antennas and circuitry for transmitting and receiving wireless signals where the antennas and circuitry are housed in the glasses 1100. In some examples, there are multiple sets of antennas and circuitry housed in the glasses 1100. In some examples, the antennas and circuitry are configured to operate in accordance with a communication protocol such as Bluetooth™, Low-energy Bluetooth™, IEEE 802, IEEE 802.11az, and so forth. In some examples, PDR sensors are housed in glasses 1100. For example, PDR sensor 610 is housed in glasses 1100 and coupled to the computer 1161.

In some examples, an application module 706 monitors the current location 708 and provides contextual notifications based on the current location 708. The contextual notifications may include things such as an indication of relevant landmarks, presentation of an option to hear about a museum piece a user of the mobile device 602 is in front of, and so forth. In some examples, the application module 706 may reside on the host device 605 and the host device 605 may monitor the current location 708 of the mobile device 602 and provide notifications based on the current location 708. In some examples, the host device 605 assumes that the mobile device 602 is within a meter or another number of meters within the host device 605 and provides notifications to the mobile device 602 based on the assumed location of the host device 605.

In some examples, a landmark application, which may be an application module 706 based on landmarks such as the Eiffel Tower, will start when the mobile device 602 is determined to be within a threshold of the landmark. In some examples the threshold is 30-50 meters. In some examples, the landmark application will end or provide an option to be terminated once the mobile device 602 moves away from the landmark.

Figure 12:
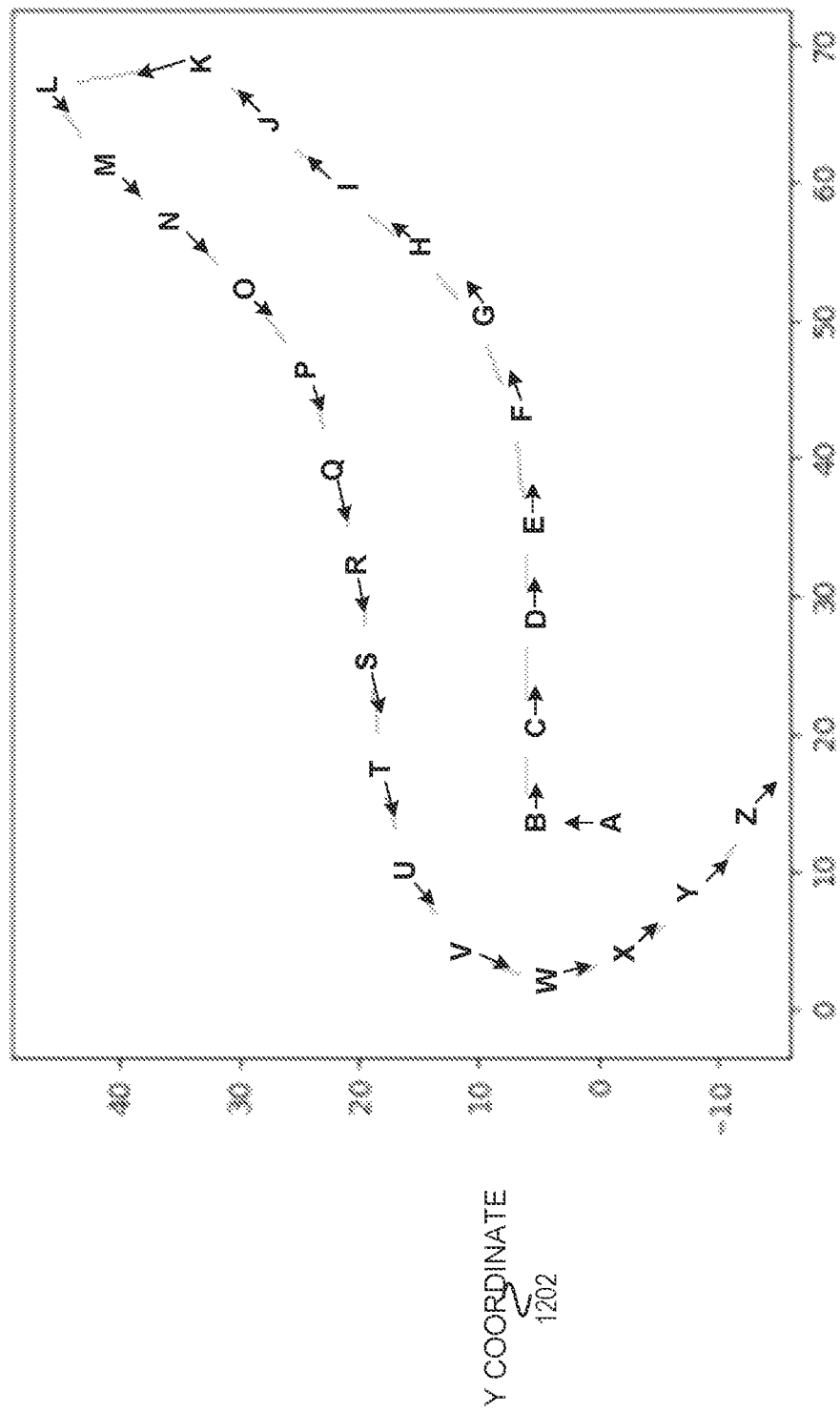
FIG. 12 illustrates location tracking, in accordance with some examples.

FIG. 12 illustrates location tracking 1200, in accordance with some examples. The Y coordinate 1202 is along a vertical axis that goes from −10 meters to 40 meters and the x coordinate 1204 is along a horizontal axis that goes from 0 meters to 70 meters. Each of the letters A-Z indicates a current heading and location 708 of the mobile device 602. The current locations 708 are determined based on location data 618 from a PDR sensor 610, in accordance with some examples. The location data 618 includes an indication of a change in heading and in distance from a previous distance. In some examples, the current locations 708 A-Z may be determined based on operations 1002-1010 where each time at operation 1010 it was determined that there was not a need to send a request 620 to a positioning system outside of the PDR sensor 610. The mobile device 602 follows the path from A to Z.

Figure 13:
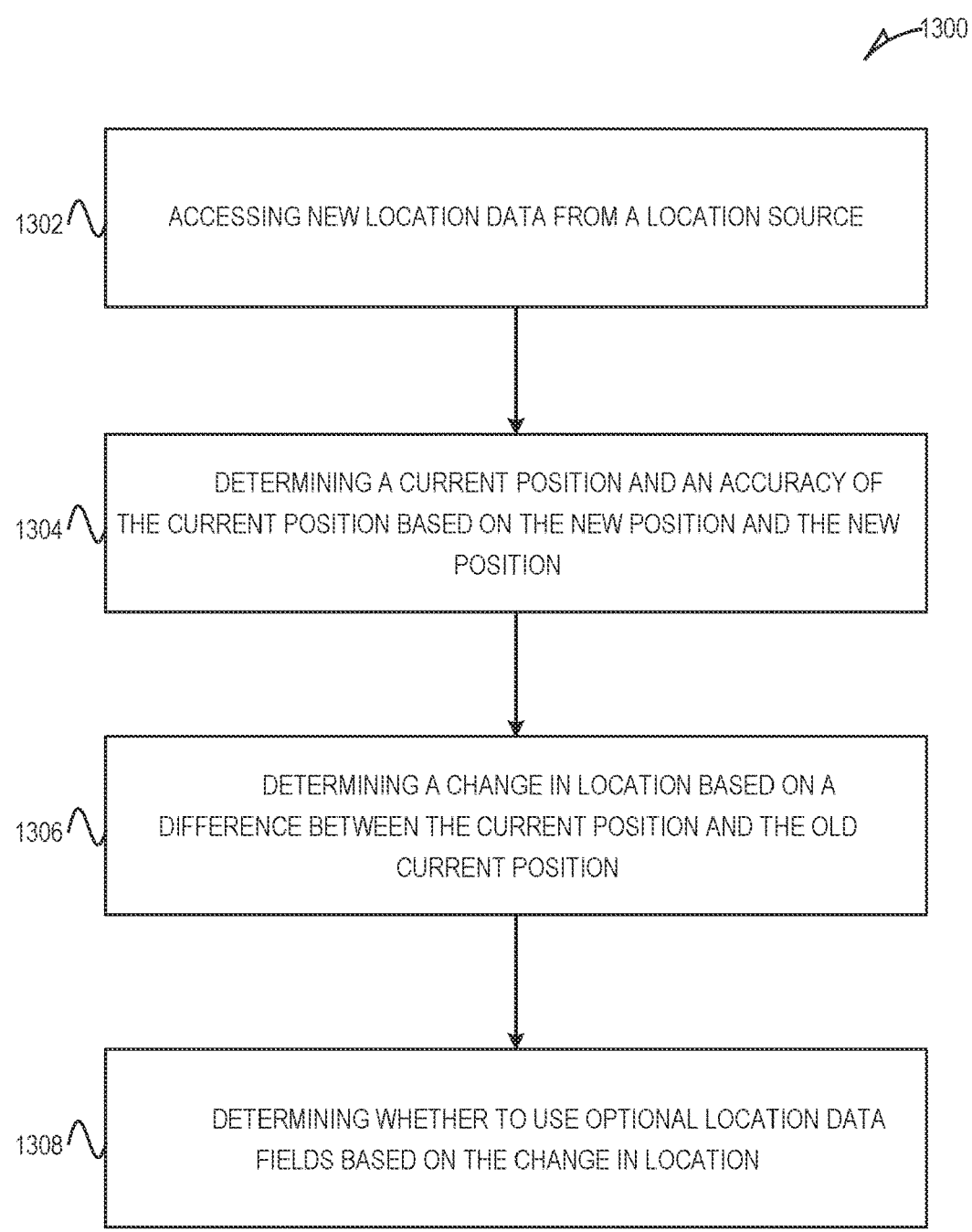
FIG. 13 illustrates a method for scheduling requests for location data, in accordance with some examples.

FIG. 13 illustrates a method 1300 for determining a device location using multi-source geolocation data, in accordance with some examples. The method 1300 begins at operation 1302 with accessing new location data from a location source of a plurality of location sources. The new location data includes a new position and an accuracy of the new position, in accordance with some examples. For example, the mobile device 602 may receive or determine new location data 612, 614, 616, 618.

The method 1300 continues at operation 1304 with determining a current position and an accuracy of the current position based on the new position and the new position. In some examples, the current position is determined further based on a previous current position and an accuracy of the previous current position. For example, method 800 may be used to determine the current location 708. In some examples, Equation (1) is used to determine the current location 708.

The method 1300 continues at operation 1306 with determining a change in location based on a difference between the current position and the previous current position. For example, as described in conjunction with FIG. 8, the mobile device 602 may determine the change in location based on the difference between the updated current location and the previous current location.

The method 1300 continues at operation 1308 with determining whether to use optional location data fields based on the change in location. For example, in some examples operation 1308 comprises one or more of the following: in response to the new location data comprising a new altitude value, setting a current altitude value with the new altitude value; and, in response to the new location data not comprising the new altitude value, based on the change in location being less than a first threshold and the old current altitude value not being a null altitude value, setting the current altitude value to the old current altitude based on the change in location not being less than a first threshold, setting the current altitude value with the null altitude value. The first threshold may be a distance such as 100 meters or another distance. Operations 814, 816, 818, and 820 perform the operations of determining whether to use optional fields of the location data 612, 614, 616, 618.

One or more of the operations of method 1300 may be optional. For example, operation 1308 may be optional. Method 1300 may include one or more additional operations. The operations of method 1300 may be performed in a different order.

Machine Architecture

Figure 14:
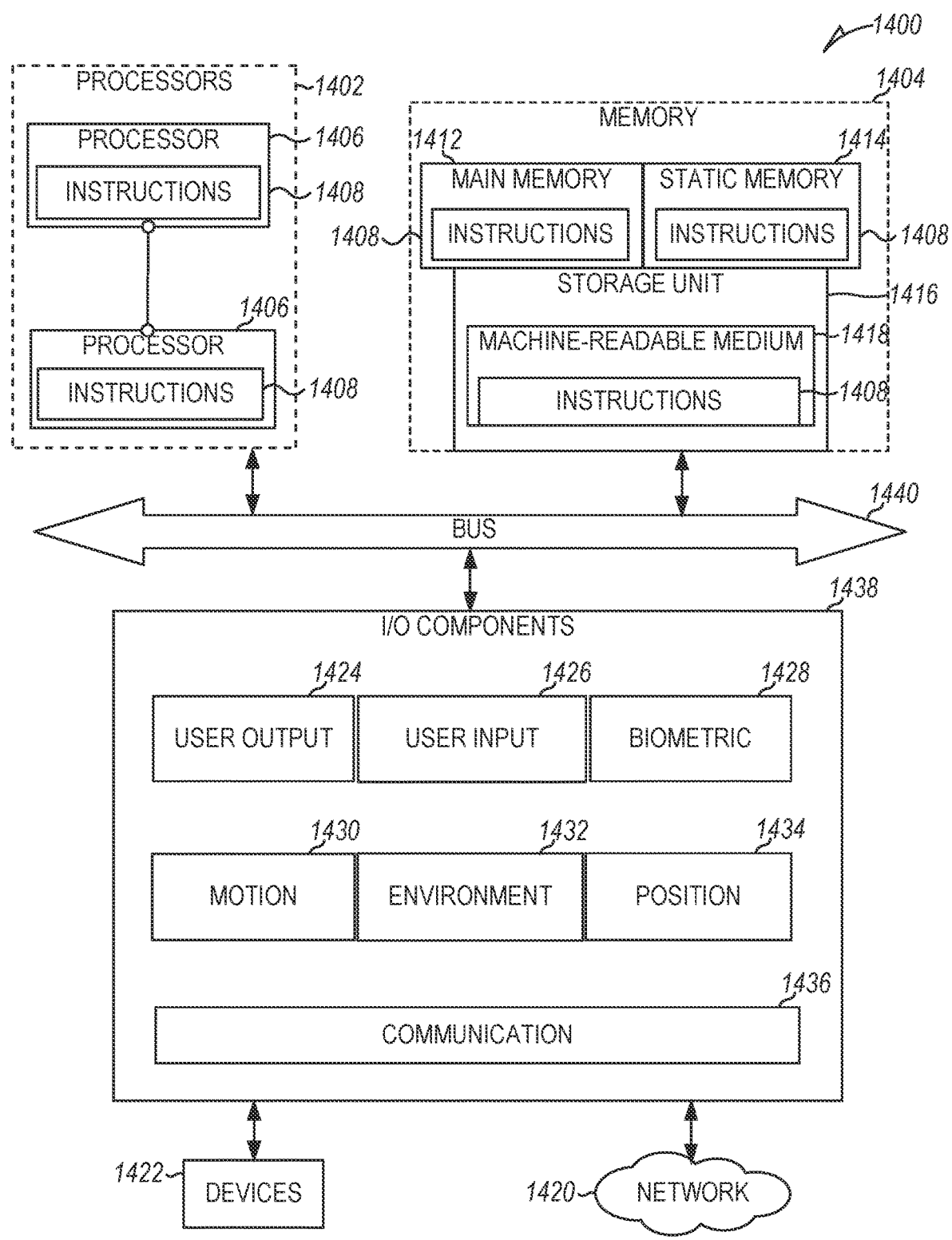
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1402, memory 1404, and input/output I/O components 1438, which may be configured to communicate with each other via a bus 1440. The processors 1402 may be termed computer processors, in accordance with some examples. In an example, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1406 and a processor 1402 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single-core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1440. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the Processor's cache memory), or any suitable combination thereof, during execution thereof by the machine 1400.

The I/O components 1438 may include a wide variety of components to receive input, provide output, produce output, transmit information, exchange information, capture measurements, and so on. The specific I/O components 1438 that are included in a particular machine will depend on the type of machine. For example, portable machines such as mobile phones may include a touch input device or other such input mechanisms, while a headless server machine will likely not include such a touch input device. It will be appreciated that the I/O components 1438 may include many other components that are not shown in FIG. 14. In various examples, the I/O components 1438 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1438 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1430 include acceleration sensor components (e.g., accelerometer), gravitation sensor components, rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1438 further include communication components 1436 operable to couple the machine 1400 to a network 1420 or devices 1422 via respective coupling or connections. For example, the communication components 1436 may include a network interface Component or another suitable device to interface with the network 1420. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1412, static memory 1414, and memory of the processors 1402) and storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed examples.

The instructions 1408 may be transmitted or received over the network 1420, using a transmission medium, via a network interface device (e.g., a network interface component included in the communication components 1436) and using any one of several well-known transfer protocols (e.g., hypertext transfer protocol (HTTP)). Similarly, the instructions 1408 may be transmitted or received using a transmission medium via a coupling (e.g., a peer-to-peer coupling) to the devices 1422.

Software Architecture

Figure 15:
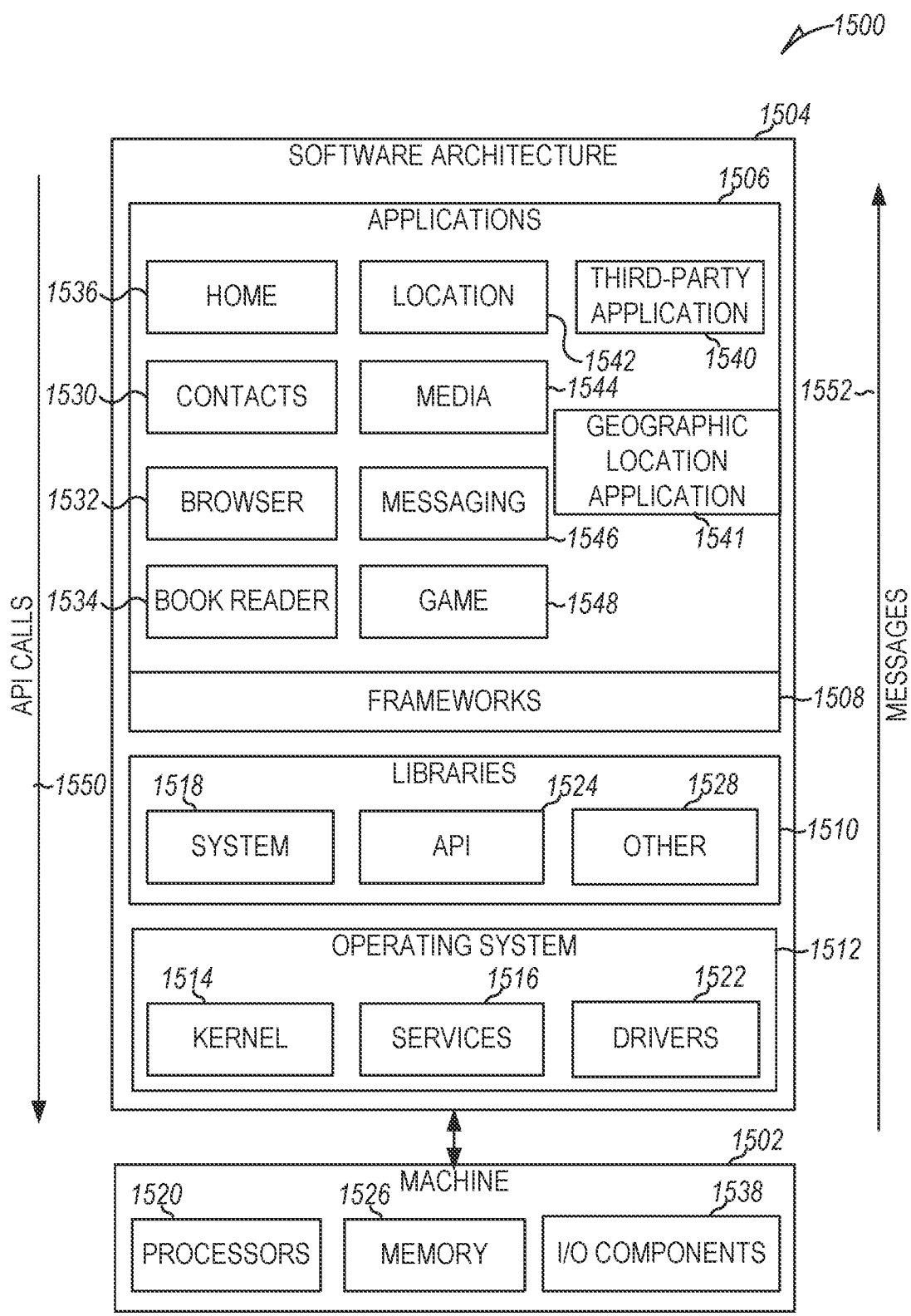
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other application program interfaces (APIs) to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a geographic location application 1541, a location application 1542, a media application 1544, a messaging application 1546, a game application 1548, and a broad assortment of other applications such as a third-party application 1540. The geographic location application 1541 may perform the operations as disclosed in conjunction with FIGS. 6-13 and herein. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
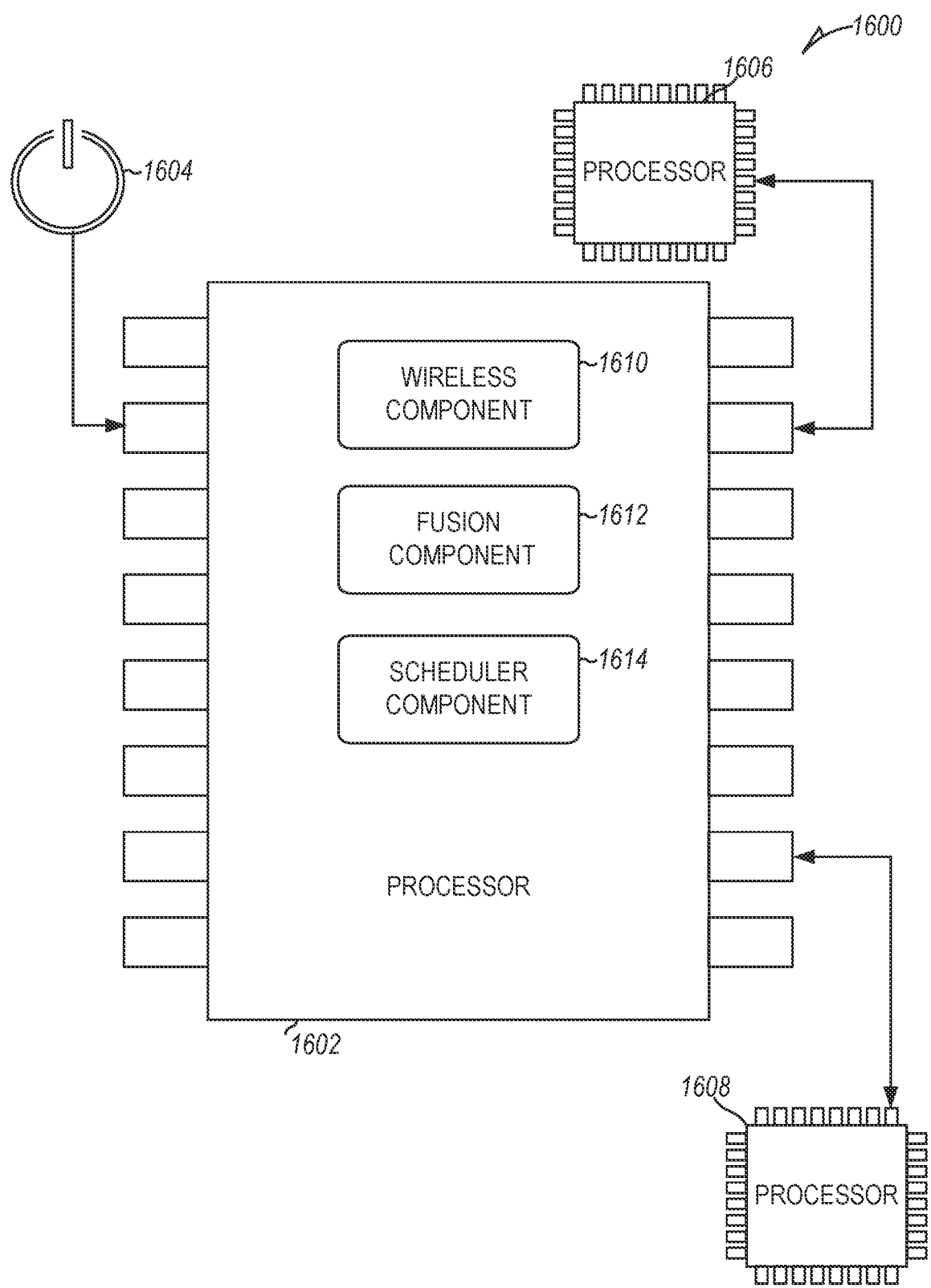
FIG. 16 is a diagrammatic representation of a processing environment, in accordance with some examples.

Turning now to FIG. 16, there is shown a diagrammatic representation of a processing environment 1600, which includes a processor 1602, processor 1606, and a processor 1608 (e.g., a GPU, CPU or combination thereof). The processor 1602 is shown to be coupled to a power source 1604, and to include (either permanently configured or temporarily instantiated) modules, namely a wireless component 1610, a fusion component 1612, and a scheduler component 1614. Referring to FIG. 7, the wireless component 1610 operationally interfaces with other wireless devices such as is illustrated in FIG. 7 as the wireless component module 718; the fusion component 1612 combines or fuses together two location data 612, 614, 616, 618 of FIG. 6 to generate a current location 708 of FIG. 7 and performs one or more of the operations of methods 800 and 1300; and, the scheduler component 1614 operationally performs the operations of update scheduler module 712 and methods 1000 and 1300. As illustrated, the processor 1602 is communicatively coupled to both the processor 1606 and the processor 1608.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1402 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed on a device, the method comprising:
    accessing new location data from a location source of a plurality of location sources, the new location data comprising a new position and an accuracy of the new position;
    determining a current position and an accuracy of the current position based on the new position, the accuracy of the new position, a previous current position, and an accuracy of the previous current position;
    determining a change in location based on a difference between the current position and the previous current position;
    determining that the new location data does not comprise a new altitude value;
    setting a current altitude value to a previous current altitude value based on the change in location not transgressing a first threshold and the previous current altitude value not being a null altitude value; and
    setting the current altitude value with the null altitude value based on the change in location transgressing the first threshold.

2. The method of claim 1 further comprising:
    in response to the new location data comprising the new altitude value, setting the current altitude value with the new altitude value.

3. The method of claim 1 wherein the current position comprises: an x value, a y value, and a z value, the previous current position comprises; an x1 value, a y1 value, and a z1 value, and the new position comprises: an x2 value, a y2 value, and a z2 value, and wherein determining the current position further comprises:
    determining the x value, the y value, and the z value as equal to: ((the x1 value, the y1 value, and the z1 value) multiplied by (1/the accuracy of the previous current position)+(the x2 value, the y2 value, and the z2 value) multiplied by (1/the accuracy of the new position))/(the change in location value).

4. The method of claim 1 wherein the current position comprises: an x value, a y value, and a z value, the previous current position comprises: an x1 value, a y1 value, and a z1 value, and the new position comprises: an x2 value, a y2 value, and a z2 value, and wherein determining the current position further comprises:
    determining the x value, the y value, and the z value based on: the x1 value, the y1 value, and the z1 value; the x2 value, the y2 value, and the z2 value; and, an accuracy of the previous current position, an accuracy of the new position, and a change in location value.

5. The method of claim 1 wherein the current position indicates a location of the device independent of an orientation of the device.

6. The method of claim 1 further comprising:
determine a velocity based on the new position, the previous current position, and an amount of time between a new timestamp and a previous current timestamp; and
in response to the velocity transgressing a threshold for a mode of transportation of the device, discarding the new location data, and accessing another new location data as the new location data.

7. The method of claim 6, wherein the mode of transportation comprises at least one of: walking, running, driving, bicycling, flying, riding a train, and riding a bus.

8. The method of claim 1 further comprising:
in response to the new location data comprising a new locality value, setting a current locality value to the new locality value; and
in response to the new location data not including the new locality value, setting the current locality value to a previous current locality value, based on the change in the location being less than a second threshold and the previous current locality value not being a null current locality value, and setting the current locality value to the null current locality value based on the change in the location not being less than the second threshold.

9. The method of claim 1, wherein the device is an augmented reality (AR) mobile device and wherein the method further comprises:
in response to a start-up of the device, determining, from one of the plurality of location sources, an initial location as the previous current position; and
determining a change in orientation of the AR mobile device.

10. The method of claim 1 further comprising:
selecting, based on one or more first conditions, a location source of the plurality of location sources; and
scheduling a request for the selected location source to generate location data.

11. The method of claim 10 wherein the request is a first request, and wherein the method further comprises:
accessing a second request for the location data from an application of the device.

12. The method of claim 10 wherein the plurality of location sources comprises: a pedestrian dead reckoning (PDR) system, a wireless signal location system, a location from a paired host device system, and a Global Navigation Satellite Systems (GNSS).

13. The method of claim 10 wherein a frequency of selecting the location source and scheduling a request for the selected location source to generate location data is based on a velocity of the device or a wearer of the device.

14. The method of claim 10 wherein the one or more first conditions comprise one or more of: a display of a device state being on or off, a WiFi status of the device, a pairing status with a paired host device system, a load of the device, a status of the device being indoor or outdoor, a connectivity status of the device with a Global Navigation Satellite Systems (GNSS), a power availability, an accuracy requirement of the location data, a velocity of the device, the change in location of the device independent of changes to an orientation of the device, and a dimensionality of the location data generated by the location source.

15. The method of claim 10 further comprising:
in response to one or more second conditions being satisfied for the request for the selected location source to generate the location data, requesting the location data from the selected location source, receiving the location data from the selected location source, and setting the received location data as the new location data.

16. The method of claim 15 wherein the one or more second conditions comprise one or more of: a display of the device being on or off, a WiFi status of the device, a pairing status with a paired host device system, a load of the device, a status of the device being indoor or outdoor, a connectivity status of the device with a Global Navigation Satellite Systems (GNSS), a power availability of the device, an accuracy requirement of the location data, a velocity of the device, a change in location of the device independent of changes to an orientation of the device, and a dimensionality of the location data generated by the location source.

17. A system comprising:
one or more computer processors;
one or more computer-readable mediums storing instructions that, when executed by the one or more computer processors, cause the system to perform operations comprising:
accessing new location data from a location source of a plurality of location sources, the new location data comprising a new position and an accuracy of the new position;
determining a current position and an accuracy of the current position based on the new position, the accuracy of the new position, a previous current position, and an accuracy of the previous current position;
determining a change in location based on a difference between the current position and the previous current position;
in response to the new location data comprising a new altitude value, setting a current altitude value with the new altitude value; and
in response to the new location data not comprising the new altitude value,
setting a current altitude value to a previous current altitude value based on the change in location being less than a first threshold and the previous current altitude value not being a null altitude value, and
setting the current altitude value with the null altitude value based on the change in location not being less than the first threshold.

18. The system of claim 17 wherein the current position comprises: an x value, a y value, and a z value, the previous current position comprises: an x1 value, a y1 value, and a z1 value, and the new position comprises: an x2 value, a y2 value, and a z2 value, and wherein determining the current position further comprises:
determining the x value, the y value, and the z value as equal to: ((the x1 value, the y1 value, and the z1 value)×(1/the accuracy of the previous current position)+(the x2 value, the y2 value, and the z2 value)×(1/the accuracy of the new position))/(the change in location value).

19. A non-transitory computer-readable storage medium including instructions that, when processed by a computer, configure the computer to perform operations comprising:
accessing new location data from a location source of a plurality of location sources, the new location data comprising a new position and an accuracy of the new position;

determining a current position and an accuracy of the current position based on the new position, the accuracy of the new position, a previous current position, and an accuracy of the previous current position;

determining a change in location based on a difference between the current position and the previous current position;

determining that the new location data does not comprise a new altitude value;

setting a current altitude value to a previous current altitude value based on the change in location being less than a first threshold and the previous current altitude value not being a null altitude value; and setting the current altitude value with the null altitude value based on the change in location transgressing the first threshold.

20. The non-transitory computer-readable storage medium of claim 19 wherein the current position comprises: an x value, a y value, and a z value, the previous current position comprises: an x1 value, a y1 value, and a z1 value, and the new position comprises: an x2 value, a y2 value, and a z2 value, and wherein determining the current position further comprises:

in response to the new location data comprising the new altitude value, setting the current altitude value with the new altitude value; and determining the x value, the y value, and the z value as equal to: ((the x1 value, the y1 value, and the z1 value)×(1/the accuracy of the previous current position)+(the x2 value, the y2 value, and the z2 value)×(1/the accuracy of the new position))/(the change in location value).

* * * * *